United States Patent
Nakata

(10) Patent No.: US 9,998,679 B2
(45) Date of Patent: Jun. 12, 2018

(54) CONTROL DEVICE, CONTROL METHOD, AND ELECTRONIC DEVICE TO CONTROL AN EXPOSURE AMOUNT OF A PIXEL GROUP

(71) Applicant: SONY CORPORATION, Tokoyo (JP)

(72) Inventor: Masashi Nakata, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days. days.

(21) Appl. No.: 14/907,431

(22) PCT Filed: Aug. 8, 2014

(86) PCT No.: PCT/JP2014/071033
§ 371 (c)(1),
(2) Date: Jan. 25, 2016

(87) PCT Pub. No.: WO2015/025740
PCT Pub. Date: Feb. 26, 2015

(65) Prior Publication Data
US 2016/0173751 A1 Jun. 16, 2016

(30) Foreign Application Priority Data
Aug. 22, 2013 (JP) ................................ 2013-171966

(51) Int. Cl.
*H04N 5/235* (2006.01)
*H04N 5/355* (2011.01)
(Continued)

(52) U.S. Cl.
CPC ......... *H04N 5/2355* (2013.01); *H04N 5/2353* (2013.01); *H04N 5/23293* (2013.01);
(Continued)

(58) Field of Classification Search
CPC .................................................... H04N 5/2355
(Continued)

(56) References Cited

U.S. PATENT DOCUMENTS

| 2012/0249844 | A1* | 10/2012 | Saito | H04N 5/2355 |
| | | | | 348/242 |
| 2012/0327270 | A1 | 12/2012 | Shirakawa et al. | |
| 2013/0293736 | A1* | 11/2013 | Kuwazoe | H04N 5/3765 |
| | | | | 348/222.1 |

FOREIGN PATENT DOCUMENTS

| CN | 101322398 A | 12/2008 |
| CN | 102025903 A | 4/2011 |

(Continued)

OTHER PUBLICATIONS

Office Action for CN Patent Application No., issued on 201480039968.3, dated Mar. 13, 2018, 12 pages of Office Action and 12 pages of English Translation.

*Primary Examiner* — Usman Khan
(74) *Attorney, Agent, or Firm* — Chip Law Group

(57) ABSTRACT

The present disclosure relates to a control device, a control method, and an electronic device that enable an adequate exposure amount to be set at high speed. A control unit controls an exposure amount of a pixel group that is a two-dimensional arrangement of a plurality of pixels. Specifically, in a first mode before recording of a photographed image is started, the control unit sets a plurality of types of exposure amounts to the pixel group, and in a second mode in which the photographed image is recorded, the control unit sets fewer types of exposure amounts than in the first mode to the pixel group. The present technology can be applied to, for example, a control device that controls a solid state imaging element.

18 Claims, 19 Drawing Sheets

(51) Int. Cl.
*H04N 9/04* (2006.01)
*H04N 5/232* (2006.01)
*H04N 5/225* (2006.01)

(52) U.S. Cl.
CPC ......... *H04N 5/35554* (2013.01); *H04N 9/045* (2013.01); *H04N 5/2356* (2013.01); *H04N 2005/2255* (2013.01)

(58) Field of Classification Search
USPC ........................................................ 348/362
See application file for complete search history.

(56) References Cited

FOREIGN PATENT DOCUMENTS

| | | |
|---|---|---|
| CN | 102724400 A | 10/2012 |
| JP | 2002-135648 | 5/2002 |
| JP | 2002-135648 A | 5/2002 |
| JP | 2002-232777 | 8/2002 |
| JP | 2002-232777 A | 8/2002 |
| JP | 2007-158544 | 6/2007 |
| JP | 2010-028423 | 2/2010 |
| JP | 2011-059337 | 3/2011 |
| JP | 2012-205244 | 10/2012 |
| JP | 2013-009105 | 1/2013 |
| JP | 2013-009105 A | 1/2013 |

\* cited by examiner

FIG. 1

| MODE | | RESOLUTION | SYSTEM | ADVANTAGE/DISADVANTAGE |
|---|---|---|---|---|
| NORMAL PHOTO-GRAPHING MODE | (pixel grid) | — | — | • HIGH RESOLUTION<br>• NO DYNAMIC RANGE EXPANSION FUNCTION |
| HDR PHOTO-GRAPHING MODE (P1) | (pixel grid) | SLIGHTLY INFERIOR THAN P2 | ELECTRONIC SHUTTER SYSTEM<br>→ EASY TO APPLY | • VARIABLE CONTROL OF DYNAMIC RANGE EXPANSION RATE IS POSSIBLE<br>• ON/OFF CONTROL OF SVE IMAGING FUNCTION IS POSSIBLE<br>• BLUR OF IMAGE, ETC. OCCURS WHEN IMAGING MOVING PHOTOGRAPHIC SUBJECT |
| | | | OPTICAL SYSTEM<br>→ EASY TO APPLY | • DYNAMIC RANGE EXPANSION RATE IS FIXED<br>• NO BLUR OF IMAGE, ETC. OCCURS WHEN IMAGING MOVING PHOTOGRAPHIC SUBJECT (SYNCHRONIZATION)<br>• RESOLUTION IS DEGRADED EVEN WHEN NO EXPANSION OF DYNAMIC RANGE IS REQUIRED |
| HDR PHOTO-GRAPHING MODE (P2) | (pixel grid) | SLIGHTLY INFERIOR THAN NORMAL PHOTO-GRAPHING MODE | ELECTRONIC SHUTTER SYSTEM<br>→ DIFFICULT TO APPLY | • VARIABLE CONTROL OF DYNAMIC RANGE EXPANSION RATE IS POSSIBLE<br>• ON/OFF CONTROL OF SVE IMAGING FUNCTION IS POSSIBLE<br>• BLUR OF IMAGE, ETC. OCCURS WHEN IMAGING MOVING PHOTOGRAPHIC SUBJECT |
| | | | OPTICAL SYSTEM<br>→ EASY TO APPLY | • DYNAMIC RANGE EXPANSION RATE IS FIXED<br>• NO BLUR OF IMAGE, ETC. OCCURS WHEN IMAGING MOVING PHOTOGRAPHIC SUBJECT (SYNCHRONIZATION)<br>• RESOLUTION IS DEGRADED EVEN WHEN NO EXPANSION OF DYNAMIC RANGE IS REQUIRED |

FIG. 12

CONTROL DEVICE, CONTROL METHOD, AND ELECTRONIC DEVICE TO CONTROL AN EXPOSURE AMOUNT OF A PIXEL GROUP

TECHNICAL FIELD

The present disclosure relates to a control device, a control method, and an electronic device, and, in particular, relates to a control device, a control method, and an electronic device that enable an adequate exposure amount to be set at high speed.

BACKGROUND ART

In recent years, as a method of expanding a dynamic range during photographing, a method in which pixels set to have a large exposure amount and pixels set to have a small exposure amount are mixed in a pixel group disposed in a matrix has been proposed (see Patent Literature 1, for example).

However, when a pixel group includes pixels having a large exposure amount and pixels having a small exposure amount, for example, the pixels that have a large exposure amount become saturated easily in a bright section and when saturated, only the pixels having a small exposure amount will be the pixels that can be output. At this moment, since the pixels that can be used to form a picture decreases, the resolution becomes degraded.

On the other hand, when all of the pixels of the pixel group are unified with the same exposure amount, when the pixel becomes saturated, no information can be obtained. In other words, since information on the type of the photographic subject and the degree of luminance is missing, information needed in control such as auto exposure, auto focus, and auto white balance cannot be obtained at all.

CITATION LIST

Patent Literature

Patent Literature 1: JP 2010-28423A

SUMMARY OF INVENTION

Technical Problem

In recent years, imaging devices including a touch panel, a representative example of which is a smartphone, are becoming popular. For example, when performing an operation so that auto focus and the like will be associated with the touched position in the image that is being photographed, if the touched position is saturated, since there is no information on how much accumulation time will remove the saturation from the position, it takes time until the exposure amount is set to the appropriate value.

In other words, if the exposure amount is equivalent to or larger than a certain value, be it fluorescent light or be it the sun, saturation occurs in the same manner and the same output value is output in both cases, that is, fluorescent light and the sun, the difference in brightness cannot be distinguished. Accordingly, the amount of reduction in the exposure amount that removes the saturation cannot be instantaneously determined and the exposure amount can only be reduced gradually, accordingly, it takes time for the exposure amount to be set to the appropriate value.

The present invention is made in view of the above situation and enables an adequate exposure amount to be set at high speed.

Solution to Problem

According to a first aspect of the present disclosure, there is provided a control device including: a control unit configured to control an exposure amount of a pixel group that is a two-dimensional arrangement of a plurality of pixels. In a first mode before recording of a photographed image is started, the control unit sets a plurality of types of exposure amounts to the pixel group, and in a second mode in which the photographed image is recorded, the control unit sets fewer types of exposure amounts than in the first mode to the pixel group.

According to the first aspect of the present disclosure, there is provided a control method by a control device that controls an exposure amount of a pixel group that is a two-dimensional arrangement of a plurality of pixels, the control method including: setting, in a first mode before recording of a photographed image is started, a plurality of types of exposure amounts to the pixel group, and setting, in a second mode in which the photographed image is recorded, fewer types of exposure amounts than in the first mode to the pixel group.

According to a second aspect of the present disclosure, there is provided an electronic device including: a solid state imaging element including a pixel group that is a two-dimensional arrangement of a plurality of pixels; and a control unit configured to, in a first mode before recording of a photographed image is started, set a plurality of types of exposure amounts to the pixel group, and in a second mode in which the photographed image is recorded, set fewer types of exposure amounts than in the first mode to the pixel group.

In the first and second aspects of the present disclosure, in a first mode before recording of a photographed image is started, a plurality of types of exposure amounts are set to the pixel group, and in a second mode in which the photographed image is recorded, fewer types of exposure amounts than in the first mode is set to the pixel group.

The control device and the electronic device may be independent devices or may be an inner block that constitutes a single device.

Advantageous Effects of Invention

According to the first and second aspects of the present disclosure, an adequate exposure amount can be set at high speed.

Note that the effect stated herein is not limiting and the effect may be either one of the effects stated in the present disclosure.

BRIEF DESCRIPTION OF DRAWINGS

FIG. 1 is a diagram summarizing the characteristics of a normal photographing mode and an HDR photographing mode.

FIG. 12 is a diagram for comparing and describing the imaging device in FIG. 4 and a typical normal photographing mode and HDR photographing mode.

DESCRIPTION OF EMBODIMENTS

Figure 2:
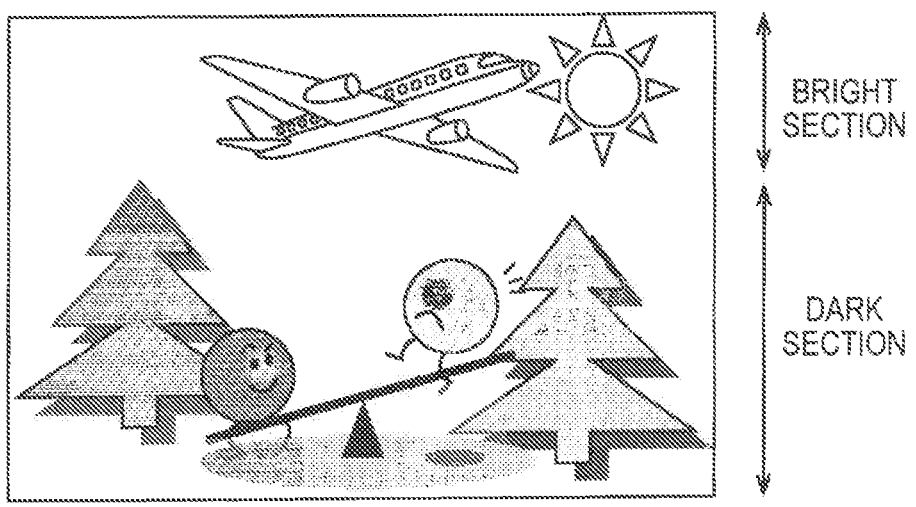
FIG. 2 is a diagram describing the difference between the normal photographing mode and the HDR photographing mode.

Hereinafter, a configuration (hereinafer, referred to as an embodiment) for implementing the present disclosure will be described. Note that the description will be given in the following order.
1. Description of normal recording mode and HDR recording mode
2. Exemplary configuration of imaging device
3. Flow of photographing image data in HDR photographing mode
4. Flow of photographing image data in normal photographing mode
5. Flow of photographing process
6. Flow of preview photographing process
7. Modifications
8. Examples of application to electronic devices 1. Description of Normal Photographing Mode and HDR Photographing Mode An imaging device 1 (FIG. 4) described in detail hereinafter includes two photographing modes (photographing methods), namely, a normal photographing mode and an HDR photographing mode, and uses either of the photographing modes according to the operating state.

Figure 3:
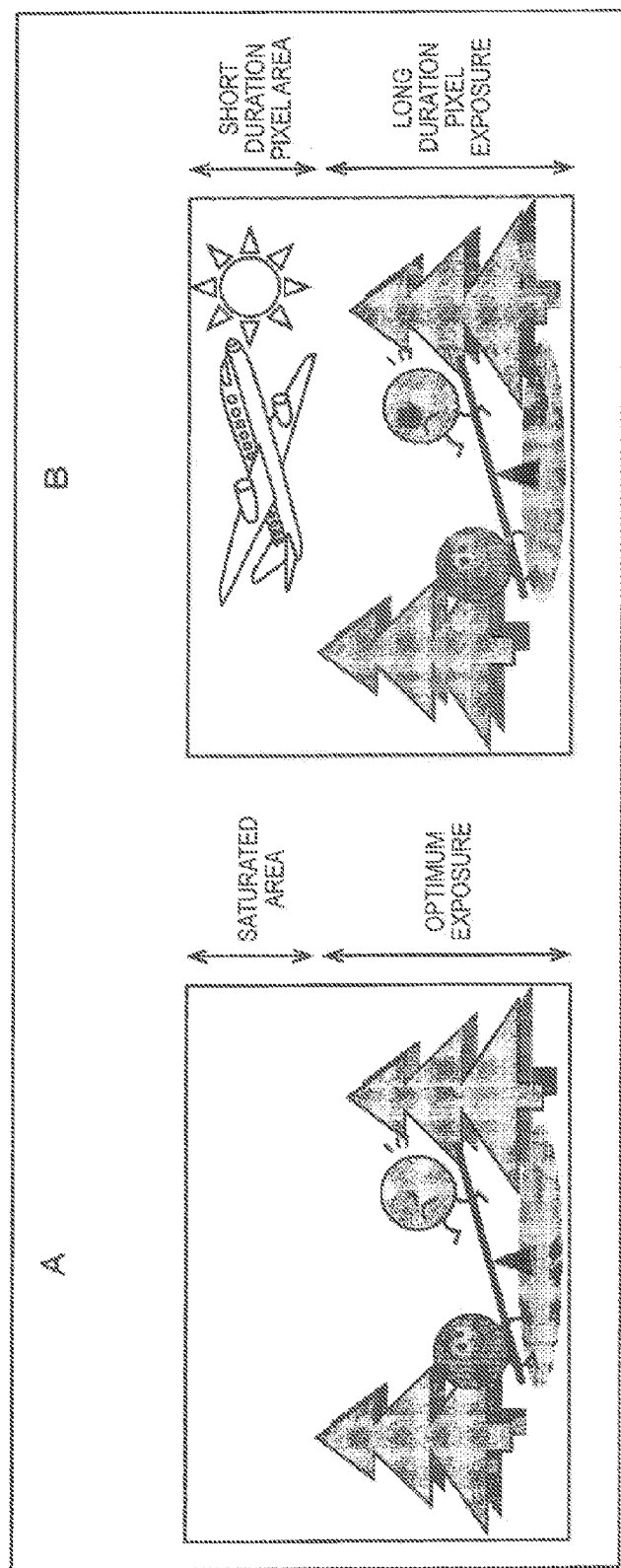
FIG. 3 is a diagram describing the difference between the normal photographing mode and the HDR photographing mode.

Referring first to FIGS. 1 to 3, general characteristics of the normal photographing mode and the HDR photographing mode will be described.

FIG. 1 is a diagram summarizing the characteristics of the normal photographing mode and the HDR photographing mode.

In the normal photographing mode, the pixels are arranged according to the Bayer array and are each set at a uniform exposure amount. Furthermore, the output signals of the pixels are obtained on the basis of the set exposure amount. While the normal photographing mode has an advantage in that the resolution is high, the normal photographing mode has a shortcoming in that there is no function of expanding the dynamic range. "$R_1$" represents an R pixel that receives red light, "$G_1$" represents a G pixel that receives green light, and "$B_1$" represents a B Excel that receives blue light.

Meanwhile, the HDR photographing mode is a mode in which an output signal with a high dynamic range (HDR) can be obtained, and in the pixel group arranged according to the Bayer array, there are pixels that are set with a large exposure amount and pixels that are set with a small exposure amount. Note that the exposure amount is a control variable that uses shutter time and a gain and is expressed by the relationship: exposure amount=shutter time×gain.

Hereinafter, a pixel with a large exposure amount will also be referred to as a long duration pixel and a pixel with a small exposure amount will also be referred to as a short duration pixel. In FIG. 1, pixels with a white background having "$R_1$", "$G_1$", or "$B_1$" displayed therein represent the long duration pixels and pixels with a black background having "$R_0$", "$G_0$", or "$B_0$" displayed therein represent the short duration pixels.

In FIG. 1, two types of HDR photographing modes in which the long duration pixels and the short duration pixels are arranged in a manner are illustrated. In an arrangement method of an array P1 of the HDR photographing mode, the odd-numbered lines are all set with long duration pixels and the even-numbered lines are all set with short duration pixels. In the arrangement method of an array P2 of the HDR photographing mode, the long duration pixels and the short duration pixels are both switched between the vertical direction and the horizontal direction every three pixels such that the long duration pixels and the short duration pixels are disposed so as to form, as a whole, lines extending in the diagonal direction.

In the HDR photographing mode, for example, even if the long duration pixels become saturated, signals can be obtained with the short duration pixels; accordingly, a tone can be provided using the short duration pixels even in a scene that becomes saturated in the normal photographing mode having a single exposure amount. On the other hand, in a scene in which the long duration pixels become saturated, since no signal can be obtained from the long duration pixels, the resolution is degraded.

The difference between the normal photographing mode and the HDR photographing mode will be further described with an exemplary photographed image.

For example, a case in which a scenery such as the one illustrated in FIG. 2 is photographed as the photographic subject will be considered. In the photographic subject illustrated in FIG. 2, the area in the upper portion is, owing to the sunlight, a bright area (a bright section) and the area in the lower portion is, owing to a shade of a tree, a relatively dark area (a dark section).

In FIG. 3, A illustrate an image in which the photographic subject in FIG. 2 has been photographed in the typical normal photographing mode, and in FIG. 3, B illustrates an image in which the photographic subject in FIG. 2 has been photographed in a typical HDR photographing mode.

In the case of A in FIG. 3 that is in normal photographing mode, since the optimum exposure amount is set to the area in the lower portion that is the dark section and the dynamic range is not sufficient, the area in the upper portion that is the bright section is saturated.

On the other hand, in the case of B in FIG. 3 that is in HDR photographing mode, the graduations for both the bright section and the dark section are obtained. However, although it is not shown in the drawing, the long duration pixels in the area in the upper portion that is the bright section are saturated and are missing pixels, and since expressed with only the short duration pixels, the resolution has been degraded. Furthermore, since in the area in the lower part that is the dark section, noise becomes large in the short duration pixels, when the short duration pixels are not used and only the long duration pixels are used, the resolution becomes degraded as well. Accordingly, it can be said that, generally, if priority were to be given to the dynamic range, the HDR photographing mode is more suitable, and if priority were to be given to the resolution, the normal photographing mode is more suitable.

In the imaging device 1 according to the present disclosure, in preview photographing that is performed before recording of the photographed image is started, the HDR photographing mode is executed, and in recording photographing that records the photographed image, normal photographing mode is executed using the exposure amount information acquired in the HDR photographing mode.

2. Exemplary Configuration of Imaging Device

Figure 4:
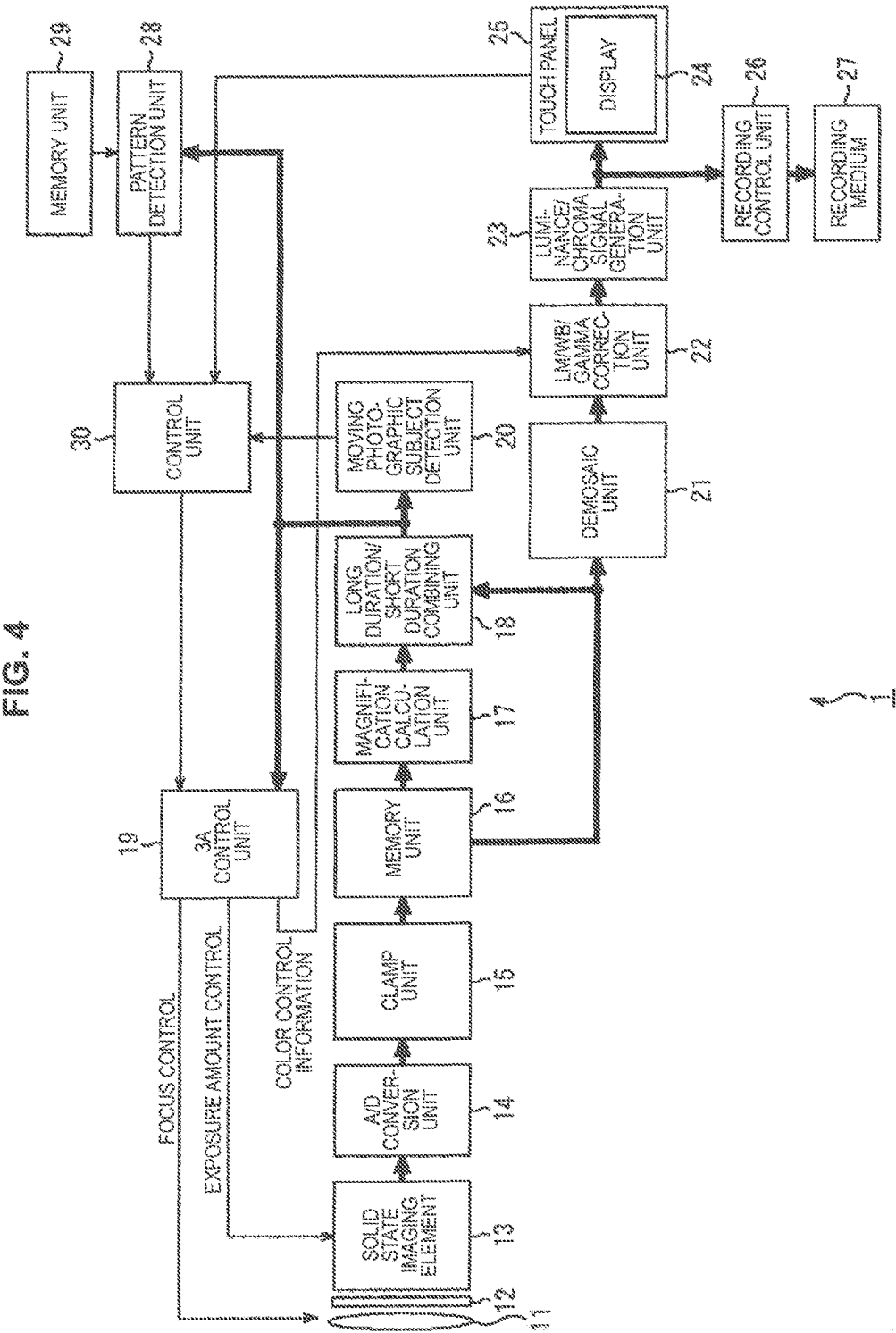
FIG. 4 is a block diagram illustrating an exemplary configuration of an imaging device according to the present disclosure.

FIG. 4 is a block diagram illustrating an exemplary configuration of an imaging device according to the present disclosure.

An optical lens 11 adjusts a focal length of photographic subject light incident on a solid state imaging element 13. An aperture (not shown) that performs light quantity adjustment of the photographic subject light incident on the solid state imaging element 13 is provided at the succeeding stage of the optical lens 11. The specific configuration of the optical lens 11 is optional and, for example, the optical lens 11 may be configured of a plurality of lenses.

The photographic subject light transmitted through the optical lens 11 is incident on the solid state imaging element 13 through an optical filter 12 configured as an IR cut filter and the like that transmits light other than infrared light.

The solid state imaging element 13 includes a pixel group (a pixel array unit) that is a two-dimensional arrangement of a plurality of pixels and converts, per pixel unit, the photographic subject light to an electric signal and supplies the electric signal to an A/D conversion unit 14.

When preview photographing, the solid state imaging element 13 is set in HDR photographing mode by a 3A control unit 19 described later and operates in HDR photographing mode. On other hand, when recording photographing, the solid state imaging element 13 is set in normal photographing mode by the 3A control unit 19 and operates in normal photographing mode.

Figure 5:
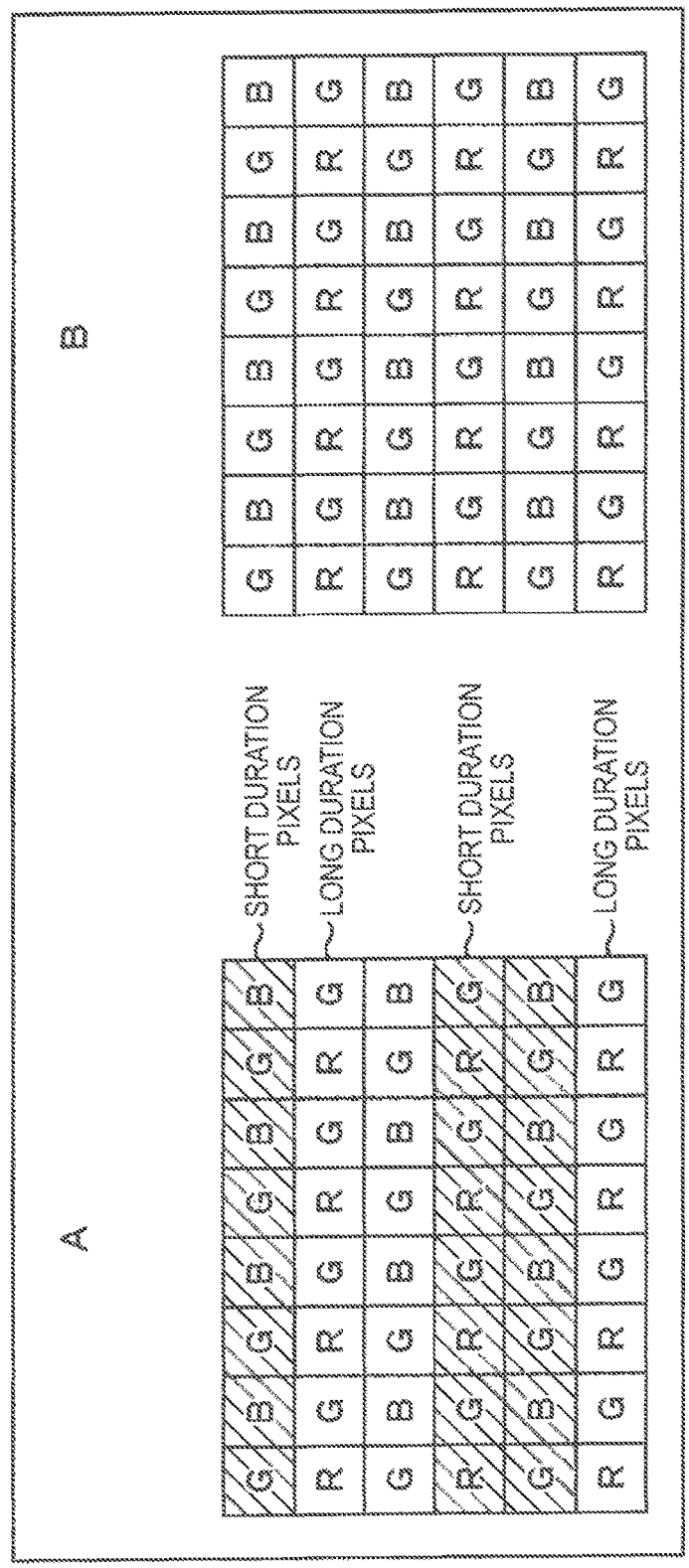
FIG. 5 is a diagram illustrating a portion of a pixel group of a solid state imaging element.

In FIG. 5, A is a diagram illustrating a state of the solid state imaging element 13 when operating in HDR photographing mode, and in FIG. 5, B is a diagram illustrating a state of the solid state imaging element 13 when operating in normal photographing mode.

In HDR photographing mode, as illustrated in A of FIG. 5, the exposure amounts of the pixels arranged according to the Bayer array are set such that the long duration pixels and the short duration pixels are arranged so as to alternate each other every two lines.

On the other hand, in normal photographing mode, as illustrated in B of FIG. 5, the pixels arranged according to the Bayer array are set at a single exposure amount. Note that in normal photographing mode, the exposure amount set to the long duration pixels in HDR photographing mode is set to all of the pixels in a uniform manner.

Referring back to FIG. 4, the A/D conversion unit 14 converts an analog electric signal (a pixel signal) supplied from the solid state imaging element 13 to a digital pixel signal. The A/D conversion unit 14 supplies the digital pixel signal after A/D conversion to a clamp unit 15.

The clamp unit 15 subtracts a black level, which is a level that is determined as black, from the pixel signal input from the A/D conversion unit 14. Subsequently, the clamp unit 15 outputs the pixel signal after subtraction of the black level to a memory unit 16.

The memory unit 16 temporarily stores the pixel signal (pixel data) from the clamp unit 15. Subsequently, the memory unit 16 supplies pixel data (hereinafter, also referred to as long exposure data) of the long duration pixels to a long duration/short duration combining unit 18 and a demosaic unit 21, and supplies pixel data (hereinafter, also referred to as short exposure data) of the short duration pixels to a magnification calculation unit 17.

The magnification calculation unit 17 multiplies the short exposure data supplied from the memory unit 16 by an exposure amount ratio so as to perform magnification correction on the short exposure data to the sensitivity of the long exposure data. Subsequently, the magnification calculation unit 17 supplies the short exposure data after the magnification correction to the long duration/short duration combining unit 18.

Figure 6:
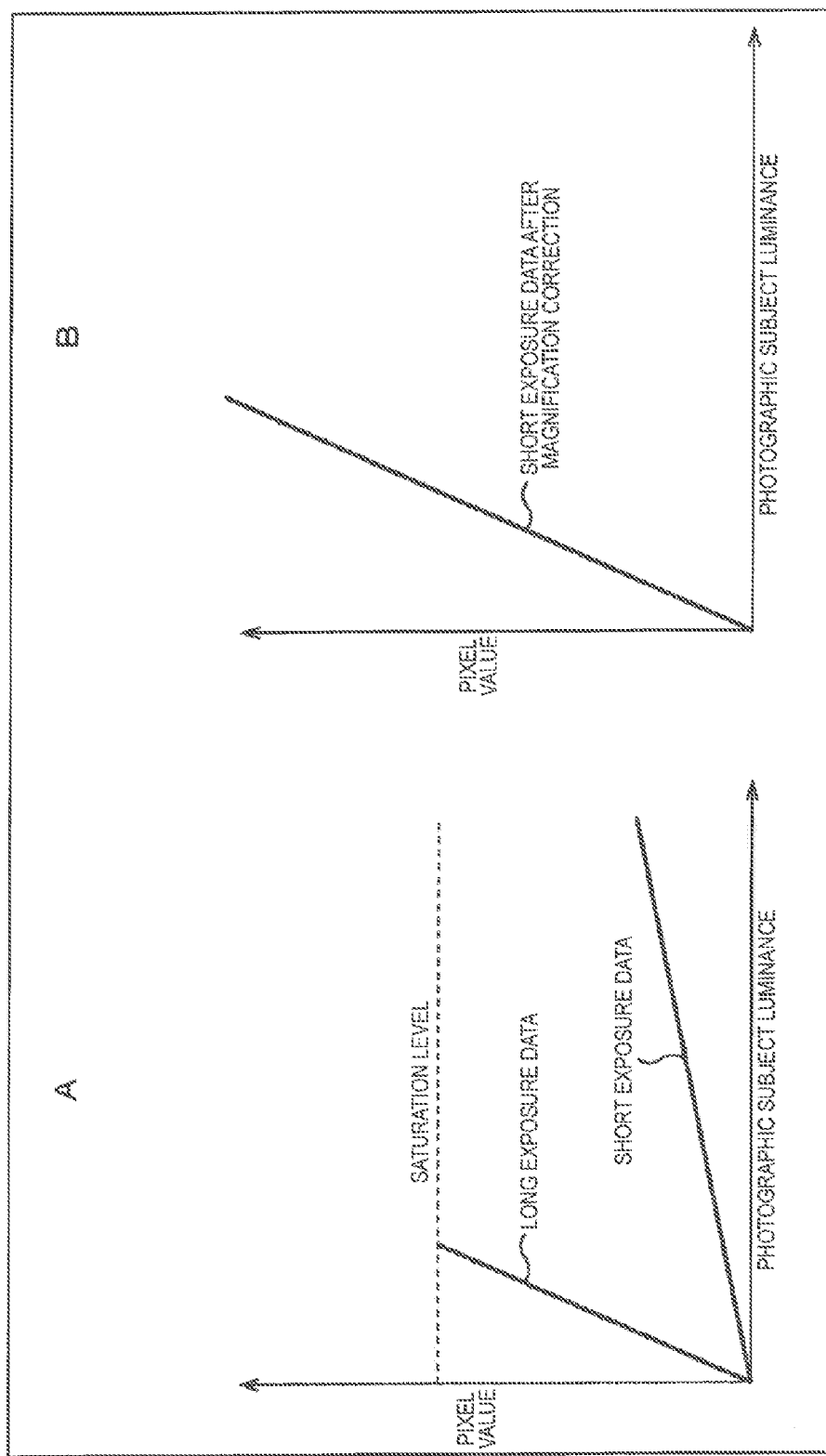
FIG. 6 is a diagram describing a magnification correction process.

FIG. 6 is a diagram describing a magnification correction process by the magnification calculation unit 17.

In FIG. 6, A indicates the relationship between the long exposure data and the short exposure data. Even in a case in which saturation occurs in the long duration pixels, in the short duration pixels, since the exposure amount is small, a saturation level is not reached and saturation does not easily occur.

By multiplying the short exposure data by the exposure amount ratio between the long duration and the short duration, the magnification calculation unit 17 generates short exposure data after the magnification correction illustrated in B of FIG. 6. With the above, a signal with a high dynamic range is generated. Note that the inclination of the short exposure data after the magnification correction is the same as the inclination of the long exposure data.

Referring back to FIG. 4, in the HDR photographing mode, the long duration/short duration combining unit 18 combines the short exposure data after the magnification correction supplied from the magnification calculation unit 17 and the long exposure data supplied from the memory unit 16 to each other. Subsequently, the long duration/short duration combining unit 18 supplies the combined data obtained as a result of the combining to the 3A control unit 19, a moving photographic subject detection unit 20, and a pattern detection unit 28.

On the other hand, in normal photographing mode, since the exposure amount of the long duration pixel is set in a uniform manner in all the pixels, the pixel values of all the pixels re supplied to the long duration/short duration combining unit 18 from the memory unit 16 as long exposure data. The long duration/short duration combining unit 18 supplies the long exposure data to the 3A control unit 19, a moving photographic subject detection unit 20, and a pattern detection unit 28.

Note that the combined data and the long exposure data supplied to the 3A control unit 19, the moving photographic subject detection unit 20, and the pattern detection unit 28 from the long duration/short duration combining unit 18 may be data per pixel, or may be, after dividing the pixel group into a plurality of blocks, pixel data per block, such as an average value of the pixel data in a block.

In HDR photographing mode, the 3A control unit 19 performs 3A control on the basis of the combined data that is a signal with high dynamic range supplied from the long duration/short duration combining unit 18. On the other hand, in normal photographing mode, the 3A control unit 19 performs 3A control on the basis of the long exposure data supplied from the long duration/short duration combining unit 18.

Herein, 3A control refers to control of auto exposure, auto focus, and auto white balance.

Accordingly, more specifically, the 3A control unit 19 determines whether the optical lens 11 is in focus on the basis of contrast information, such as the combined data, supplied from the long duration/short duration combining unit 18, and on the basis of the determination result, performs drive control of the optical lens 11. Furthermore, the 3A control unit 19 determines the shutter time and the gain of each pixel of the solid state imaging element 13 on the basis of the combined data and the like supplied from the long duration/short duration combining unit 18, and sets the shutter time and the gain for the solid state imaging element 13. Furthermore, on the basis of the combined data and the like supplied from the long duration/short duration combining unit 18, the 3A control unit 19 generates color control information for performing color processing, such as the white balance, and supplies the color control information to a LM/WB/gamma correction unit 22.

The moving photographic subject detection unit 20 executes processing of detecting the moving photographic subject in the photographed image and supplies the detection result to a control unit 30.

The demosaic unit 21 performs demosaic processing on the long exposure data from the memory unit 16 to perform complement and the like of the color information and converts the data to RGB data. The demosaic unit 21 supplies the image data after the demosaic processing to the LM/WB/gamma correction unit 22.

The LM/WB/gamma correction unit 22 performs correction of the color property on the image data from the demosaic unit 21 using color control information from the 3A control unit 19. Specifically, in order to fill the difference between the chromaticity point of the primary color (RGB) specified in the standard and the chromaticity point of the actual camera, the LM/WB/gamma correction unit 22, using a matrix coefficient, corrects each of the color signals of the image data and performs processing of changing the color productivity. Furthermore, the LM/WB/gamma correction unit 22 adjusts the white balance by setting a gain of the white in the value of each channel of the image data. Moreover, the LM/WB/gamma correction unit 22 adjusts the relative relationship between the color of the image data and the characteristics of the output device and performs gamma correction to obtain a display that is more close to the original. LM/WB/gamma correction unit 22 supplies the image data after the correction to a luminance/chroma signal generation unit 23.

The luminance/chroma signal generation unit 23 generates a luminance signal (Y) and color difference signals (Cr and Cb) from the supplied image data from the LM/WB/gamma correction unit 23. The luminance/chroma signal generation unit 23 generating the luminance/chroma signals (Y, Cr, and Cb) supplies the luminance signals in the color difference signals to a display 24 and a recording control unit 26.

The display 24 includes, for example, a display such as a liquid crystal display (LCD) or an organic electroluminescence (EL) display, and a display driver that drives the display.

The display 24 displays an image based on image data (luminance/chroma signals) supplied from the luminance/chroma signal generation unit 23. In other words, the display 24 displays a moving image or a still image taken by the solid state imaging element 13. A touch panel 25 is superimposed on the display 24 such that operation on and input to the display 24 with a finger of a user or the like can be detected. Touch input information detected by the touch panel 25 is supplied to the control unit 30.

When a record button (not shown) and the like is operated and start of recording is instructed, the recording control unit 26 performs compression coding processing based on a predetermined coding method on the image data supplied from the luminance/chroma signal generation unit 23 and records the resultant image data in a recording medium 27. The recording medium 27 is configured of, for example, a semiconductor memory, a magnetic recording medium, or a magneto-optical recording medium, and stores (records) the compressed and coded image data of the photographed image.

On the basis of the combined data and the like supplied from the long duration/short duration combining unit 18, the pattern detection unit 28 detects whether there is a pattern in the photographed image that matches a pattern image pre-registered in a memory unit 29, and supplies the detection result to the control unit 30. The memory unit 29 stores pattern images of faces and objects that are needed for a pattern detection performed by the pattern detection unit 28.

The control unit 30 controls the entire operation of the imaging device 1. For example, on the basis of the operation on the record button (not shown) for operating the on and off of the recording the control unit 30 determines whether it is preview photographing or recording photographing and supplies a control signal that switches between the normal photographing mode and the HDR photographing mode to the 3A control unit 19. On the basis of the control signal from the control unit 30, the 3A control unit 19 sets the exposure amount according to the normal photographing mode or the HDR photographing mode to the pixels of the solid state imaging element 13.

Furthermore, in the basis of moving photographic subject information supplied from the moving photographic subject detection unit 20, touch input information supplied from the touch panel 25, pattern detection information supplied from the pattern detection unit 28, and the like, the control unit 30 supplies a 3A control area signal that indicates the target area of the 3A control to the 3A control unit 19.

Specifically, on the basis of the touch input information supplied from the touch panel 25, the control unit 30 supplies, to the 3A control unit 19, information indicating the area in which the user has designated in the photographed image as a 3A control subject area for adjusting the focus and the exposure amount.

Furthermore, for example, on the basis of moving photographic subject information supplied from the moving photographic subject detection unit 20, the control unit 30 supplies, to the 3A control unit 19, information indicating the area in which the predetermined object that has been detected in the photographed image is present as the 3A control subject area for adjusting the focus and the exposure amount.

Alternatively, on the basis of the pattern detection information supplied from the pattern detection unit 28, the control unit 30 supplies, to the 3A control unit 19, information indicating the area of the face of the user detected in the photographed image as the 3A control subject area for adjusting the focus and exposure amount.

Accordingly, the moving photographic subject detection unit 20, the touch panel 25, and the pattern detection unit 28 function as area specifying units that specify a predetermined area of the pixel group that is the area subject to the 3A control (for example, the determination of the exposure amount).

Note that how the control unit 30 selects or combines the moving photographic subject information, the touch input information, and the pattern detection information for use is optional.

Note that the 3A control unit 19 and the control unit 30 may be implemented by, for example, having a central processing unit (a CPU) read out and execute a program stored in a read only memory (a ROM), or the 3A control unit 19 and the control unit 30 may be provided as a single control unit (control device).

Furthermore, the 3A control unit 19 and the control unit 30 may be configured together with the solid state imaging element 13 in a form of a one-chip, or may be in a form of an imaging module packaged together with the optical lens 11 and the optical filter 12.

Furthermore, the 3A control unit 19 and the control unit 30 may be configured as a single control device together with the magnification calculation unit 17, the long duration/short duration combining unit 18, and the like. In other words, each of the components of the imaging device 1 can be divided or integrated into any unit, and may be configured as a single device, a module, a chip, and the like.

The imaging device 1 is configured in the above manner.

3. Flow of Photographing Image Data in HDR Photographing Mode

Figure 7:
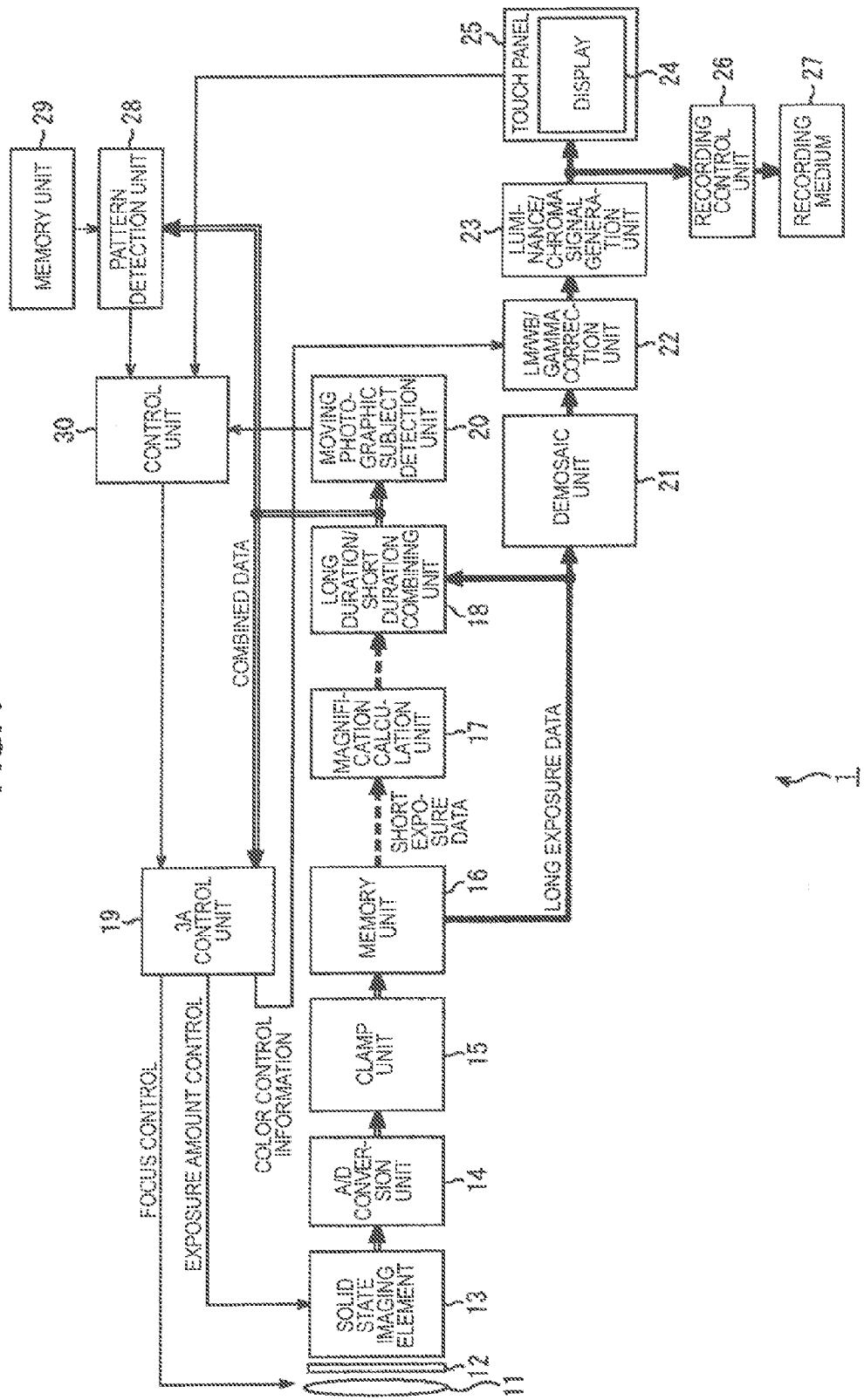
FIG. 7 is a diagram illustrating a flow of photographing image data when in HDR photographing mode.

FIG. 7 illustrates a flow of the photographing image data when the imaging device 1 is operating in HDR photographing mode.

The pixel data of each pixel that is set to either a long duration pixel or a short duration pixel and that has been obtained in the solid state imaging element 13 is supplied to the memory unit 16 and is stored.

Furthermore, the short exposure data that is pixel data of a short duration pixel is supplied to the magnification calculation unit 17 from the memory unit 16, and after magnification correction has been performed on the short exposure data by the magnification unit 17, the resultant data is supplied to the long duration/short duration combining unit 18.

Meanwhile, the long exposure data that is pixel data of a long duration pixel is supplied to the long duration/short duration combining unit 18 and the demonsaic unit 21 from the memory unit 16.

In the long duration/short duration combining unit 18, the short exposure data and the long exposure data after magnification correction are combined and, the resultant combined data is supplied to the 3A control unit 19. Accordingly, in the HDR photographing mode, the 3A control is executed on the basis of combined data with a high dynamic range.

Furthermore, the combined data with the high dynamic range is also supplied to the moving photographic subject detection unit 20 and the pattern detection unit 28. With the above, the moving photographic subject detection unit 20 and the pattern detection unit 28 will be capable of detecting the moving photographic subject and the face of the user that exist in an area which cannot normally be viewed due to saturation.

Meanwhile, only the long exposure data is supplied to the demosaic unit 21 from the memory unit 16. Accordingly the image that is displayed on the display 24 when preview photographing is an image, such as the image illustrated in A of FIG. 8, based on signals to which thinning out has been performed.

Figure 8:
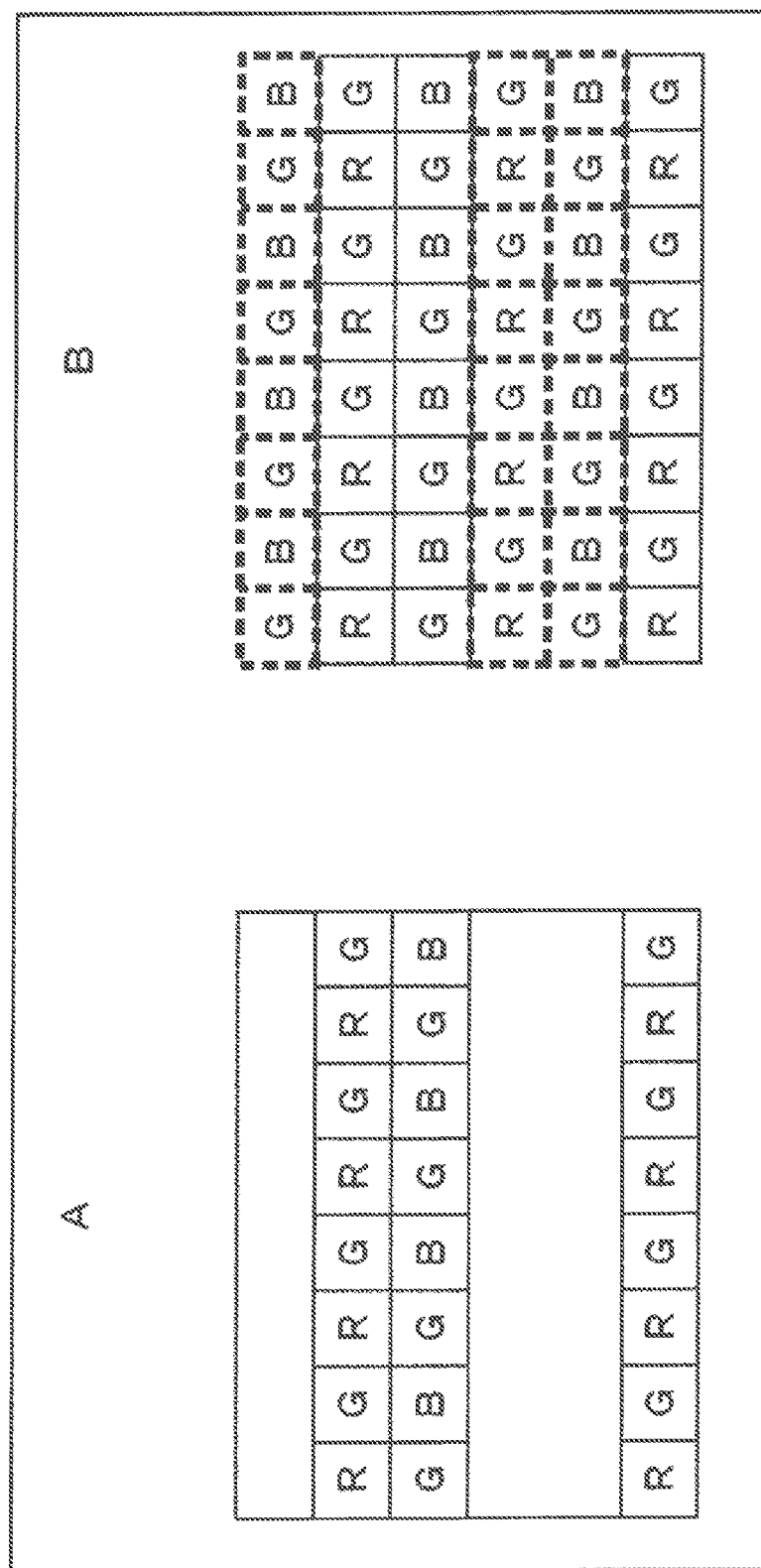
FIG. 8 is a diagram describing pixel complement when preview photographing.

The image that is displayed on the display 24 when preview photographing may be the image based on signals to which thinning out has been performed; however, it goes without saying that, as illustrated in B of FIG. 8, an image in which pixel data of the missing short duration pixels has been complemented may be displayed.

Figure 9:
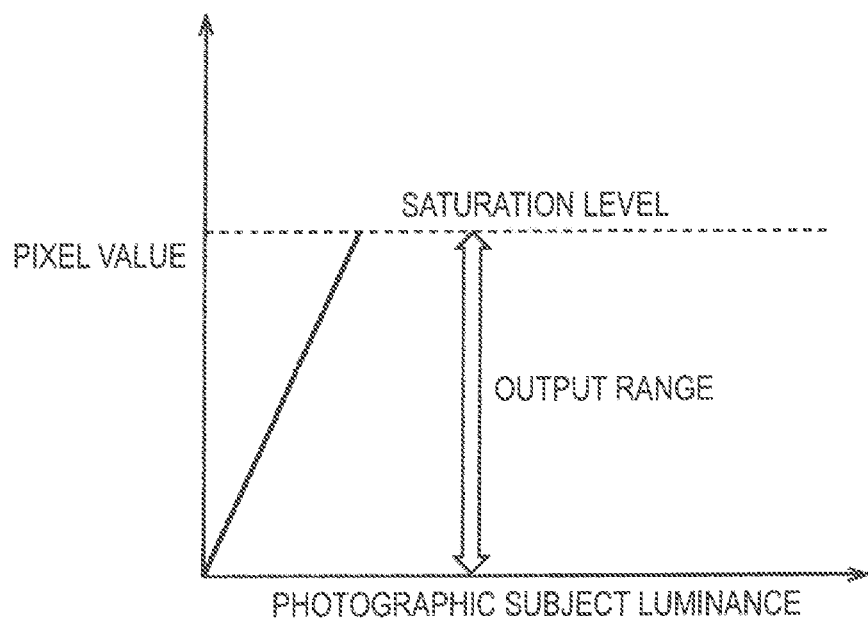
FIG. 9 is a diagram describing clipping processing when preview photographing.

The method of complementing the pixel data of the short duration pixels may be a method that makes estimation through bilinear completion from neighboring pixel data; however, pixel data of the short duration pixels may be used, for example. In such a case, the long duration/short duration combining unit 18 supplies, to the demosaic unit 21, the combined data in which the short exposure data and the long exposure data after the magnification correction are combined. However, different from the combined data supplied to the 3A control unit 19 and the like, as illustrated in FIG. 9, pixel data that is at or above the saturation level is not supplied, and combined data clipped within the same output range as the long duration pixel is supplied to the demosaic unit 21 from the long duration/short duration combining unit 18 as signal for displaying on the display.

For example, when the pixel data of the long duration pixels are operated with 10-bit, 1024 tones, then the magnification correction data of the short duration pixels is also expressed with 1024 tones. The above is for not creating any difference in the dynamic ranges of the pixel signals for displaying on the display between the dynamic range for preview photographing and the dynamic range for recording photographing, since, as illustrated in B of FIG. 6, while magnification correction data of the short duration pixels can express an area that is further bright, when recording photographing, it is presupposed that operation is performed in normal photographing mode. With the above, since there will be no difference between the image displayed on the display 24 when preview photographing and the image displayed on the display 24 when recording photographing, it is possible to photograph and record images that the user intended when recording photographing.

Figure 10:
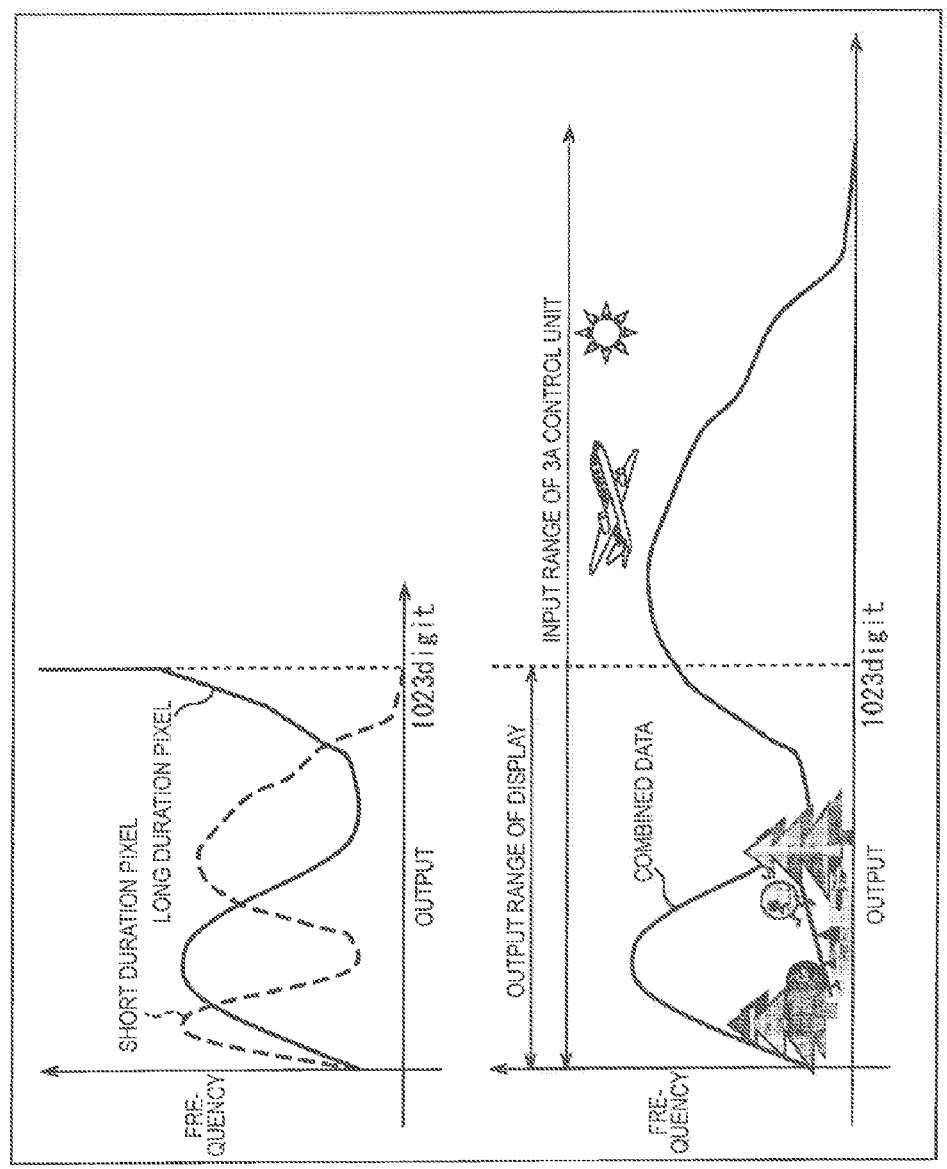
FIG. 10 is a diagram illustrating a conceptual diagram of an image data in HDR photographing mode.

FIG. 10 illustrates a conceptual diagram of an image data in HDR photographing mode of the imaging device 1.

The upper section of FIG. 10 illustrates a conceptual diagram of the image data of the short duration pixel and the long duration pixel input in the memory unit 16. When the number of operation bits of the pixel signal is 10 bits, the short duration pixel and the long duration pixel are both expressed by 1024 tones.

The lower section of FIG. 10 illustrates a conceptual diagram of the combined data after combination processing has been performed by the long duration/short duration combining unit 18. The combined data after combination processing has been performed is expressed with a high dynamic range that exceeds 1024 tones.

However, as illustrated above, combined data with a high dynamic range that exceeds 1024 tone is only input to the 3A control unit 19, and an image in which the combined data is clipped at 1024 tones is displayed on the display 24.

Since the combined data with a high dynamic range exceeding 1024 tones is input to the 3A control unit 19, for example, even if an area in which clipping has been performed in the display of the display 24 is designated as the 3A control target area, 3A control can be executed immediately so that the area has an optimum exposure amount.

In a typical HDR photographing mode, as the display of the display 24, combined data with a high dynamic range exceeding 1024 tones is used; accordingly, the imaging device 1 of the present disclosure is different from the typical HDR photographing mode in the above point.

4. Flow of Photographing Image Data in Normal Photographing Mode

Figure 11:
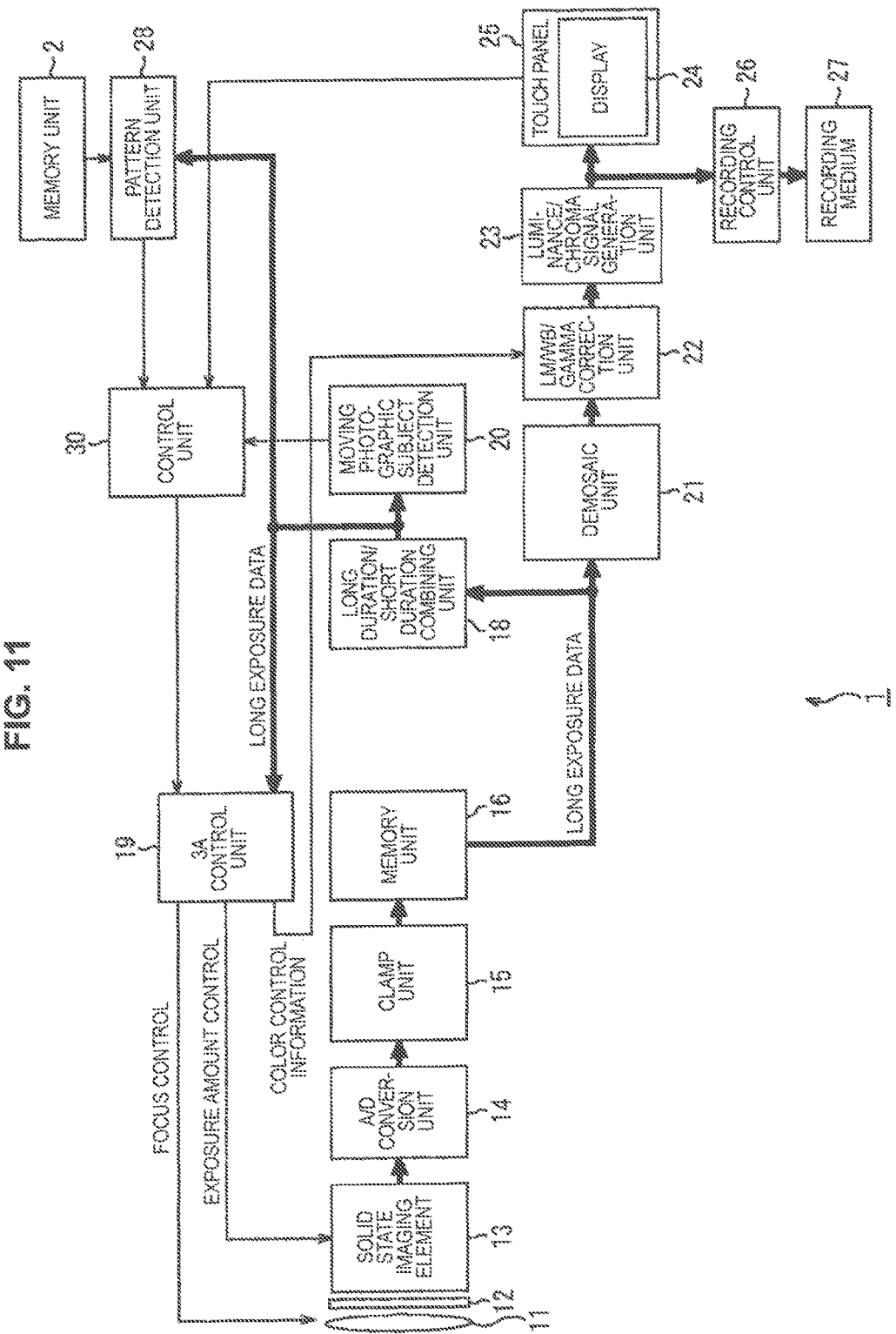
FIG. 11 is a diagram illustrating a flow of photographing image data when in the normal photographing mode.

FIG. 11 illustrates a flow of the photographing image data when the imaging device 1 is operating in normal photographing mode.

In the normal photographing mode, all of the pixels of the solid state imaging element 13 are set with the same exposure amount. In the present embodiment, as described above, since all of the pixels of the solid state imaging element 13 are set to the exposure amount of the long duration pixels that is the optimum exposure amount when preview photographing, long exposure data is stored in the memory unit 16.

Furthermore, the long exposure data that has been stored in the memory unit 16 is supplied to the long duration/short duration combining unit 18 and the demosaic unit 21.

The long duration/short duration combining unit 18 supplies the long exposure data that has been provided from the memory unit 16 as it is to the 3A control unit 19, the moving photographic subject detection unit 20, and the pattern detection unit 28. Accordingly, in the normal photographing mode, the 3A control is executed on the basis of the image data that has been obtained by unifying the exposure amount of all the pixels.

Furthermore, since the image data that has been obtained by setting all of the pixels to the exposure amount of the long duration pixels is also supplied to the demosaic unit 21, the high resolution image set to the optimum exposure amount is displayed on the display 24 and the image is recorded in the recording medium 27.

<Comparison Between Typical Normal Photographing Mode and HDR Photographing Mode>

Figure 12:
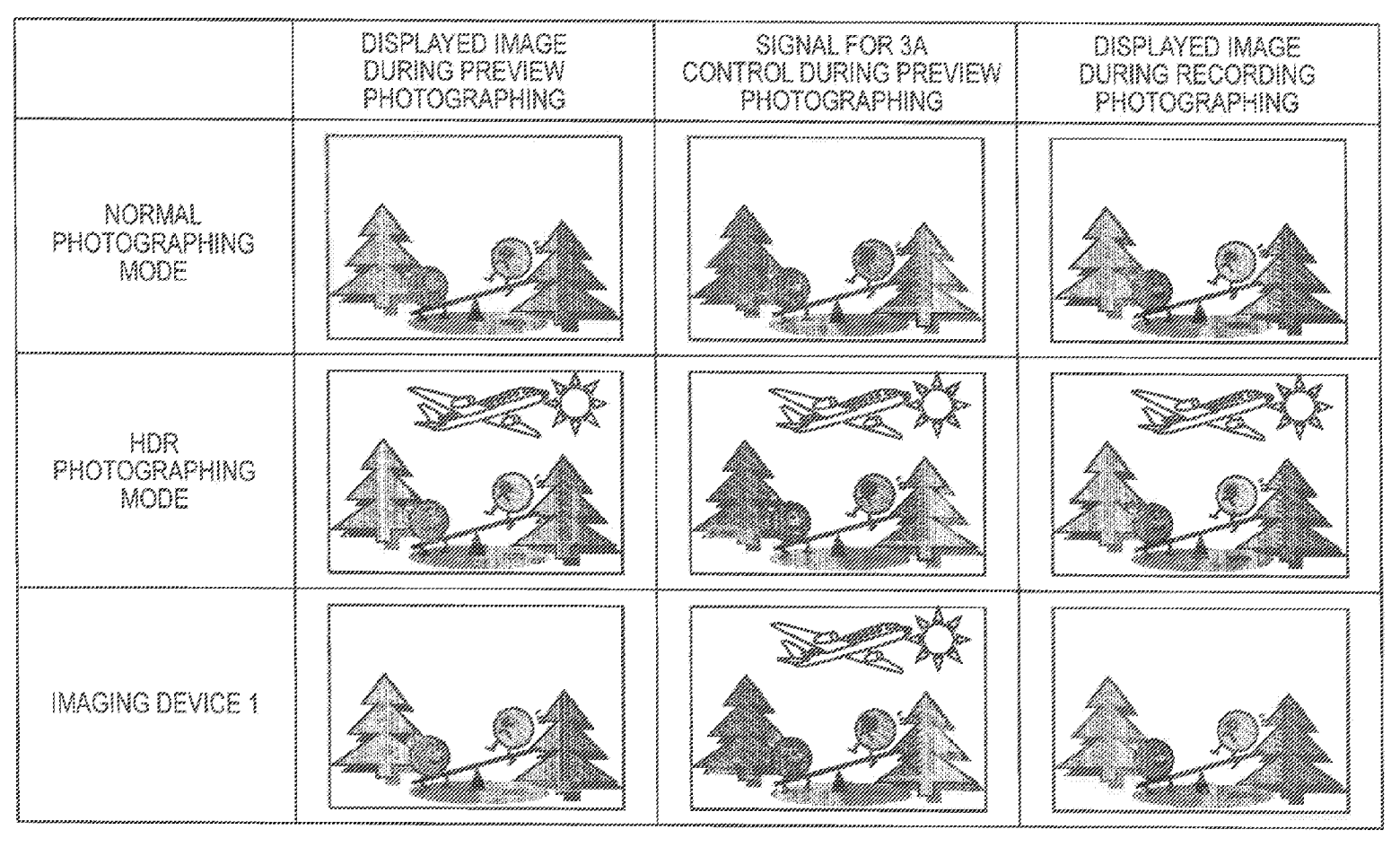

Referring to FIG. 12, the imaging device 1 of the present disclosure, and a typical normal photographing mode and HDR photographing mode will be compared and described further.

In a typical normal photographing mode, either of the display image displayed on the display 24 when preview photographing, the signal used in 3A control, and the display image (recorded image the same) displayed on the display 24 when recording photographing are images with high resolution but with a narrow dynamic range.

On the other hand, in a typical HDR photographing mode, either of the display image displayed on the display 24 when preview photographing, the signal used in 3A control, and the display image (recorded image the same) displayed on the display 24 when recording photographing are images with a wide dynamic range scarifying resolution.

Conversely, in the imaging device 1, in preview photographing, while the solid state imaging element 13 is controlled with the same drive as that of the typical HDR photographing mode and a signal with a high dynamic range that is the same as that of the typical HDR photographing mode is used in the 3A control, only the signals of the long duration pixels are used for the display image displayed on the display 24. Furthermore, when recording photographing as well, since an image based on the signals of the long duration pixels is displayed on the display 24, the imaging device 1 has a feature in that the display image of the preview photographing and the display image of the recording photographing do not appear to be different.

Furthermore, in the imaging device 1, since a signal with a high dynamic range is used in the 3A control, even if there is a touch input by the user to an area, which is saturated if it were a typical normal photographing mode, as the 3A control target area, the appropriate exposure amount of the touched position can be calculated in an instance and control can be performed.

Furthermore, when the recoding photographing is started, since the above appropriate exposure amount is set to all of the pixels, an image with high resolution can be displayed and recorded.

Accordingly, according to the imaging device 1, even if a scene with an intense difference in brightness is recorded, in preview photographing, the exposure amount and the focus can be set to the optimum values instantaneously and the problem that occurs in the typical HDR photographing mode, that is, the resolution of the recorded photographed image being low, can be overcome.

In other words, in the imaging device 1, in preview photographing in which no image is kept, control using pixel signals with a wide dynamic range is performed, and in recording photographing in which the image is kept, control setting a single exposure amount to increase the resolution is performed.

5. Flow of Photographing Process

Figure 13:
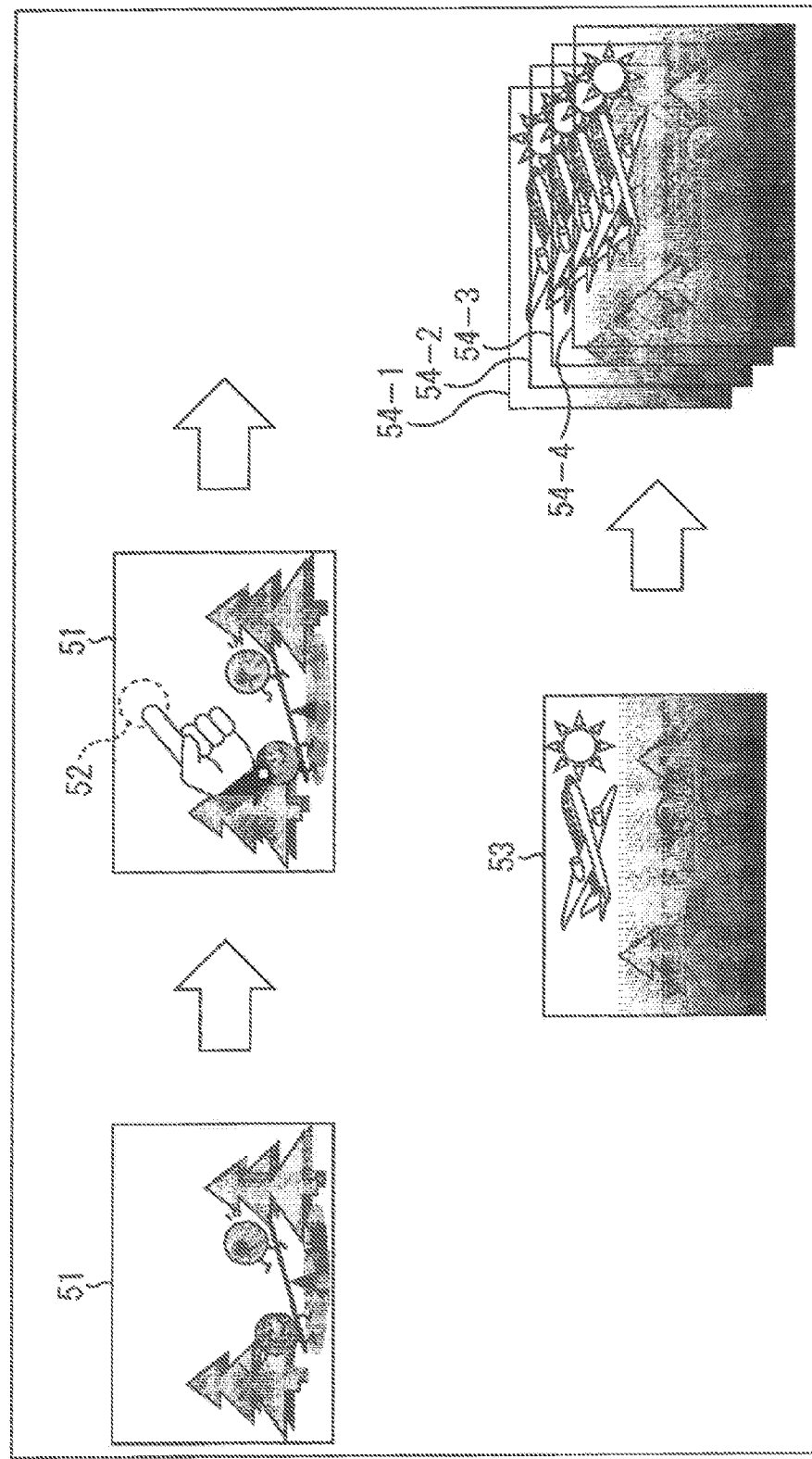
FIG. 13 is a diagram illustrating a flow of a photographing process with the imaging device of the present disclosure.

FIG. 13 illustrates a flow of the photographing process with the imaging device 1.

In preview photographing, an image 51 that has a narrow dynamic range (that has been clipped) is displayed on the display 24.

Furthermore, for example, suppose that the user has touched a saturated area (pixels) 52 in the image 51 that is displayed on the display 24 as the 3A control subject area. In the above, the touch position detected by the touch panel 25 is supplied to the 3A control unit 19 through the control unit 30.

Since signals with a high dynamic range based on the combined data is supplied to the 3A control unit 19, the 3A control unit 19 is capable of calculating the appropriate 3A controlled variable of the area 52 that has not been displayed on the display 24, and performs control such that the touched position has an adequate exposure amount, focus position, and white balance. With the above, an image 53 appropriately set with an exposure amount, a focus position, and the like that corresponds to the touch position is displayed on the display 24.

Furthermore, when the record button is pressed down, a moving image (images 54-1, 54-2, 54-3, . . . ) to which an appropriately set exposure amount is applied to all of the pixels is recorded and is displayed on the display 24, and is recorded in the recording medium 27.

In the typical normal photographing mode, when the touched position is saturated, since there is no information on how much accumulation time is needed on that position to remove the saturation, the exposure amount needs to be reduced gradually, accordingly, it takes time for the exposure amount to be set to the appropriate value.

In the imaging device 1 of the present disclosure, as described above, signals with a high dynamic range on the basis of the combined data is used in the 3A control; accordingly, even if the touch position is saturated on the display 24, the adequate exposure amount can be set quickly and accurately and the focus can be adjusted as well.

In other words, in the imaging device 1 of the present disclosure, by having the signals with a high dynamic range on the basis of the combined data applied to only the 3A control of the preview photographing, the adequate exposure amount can be set quickly and accurately and the focus can be adjusted as well.

6. Flow of Preview Photographing Process

Figure 14:
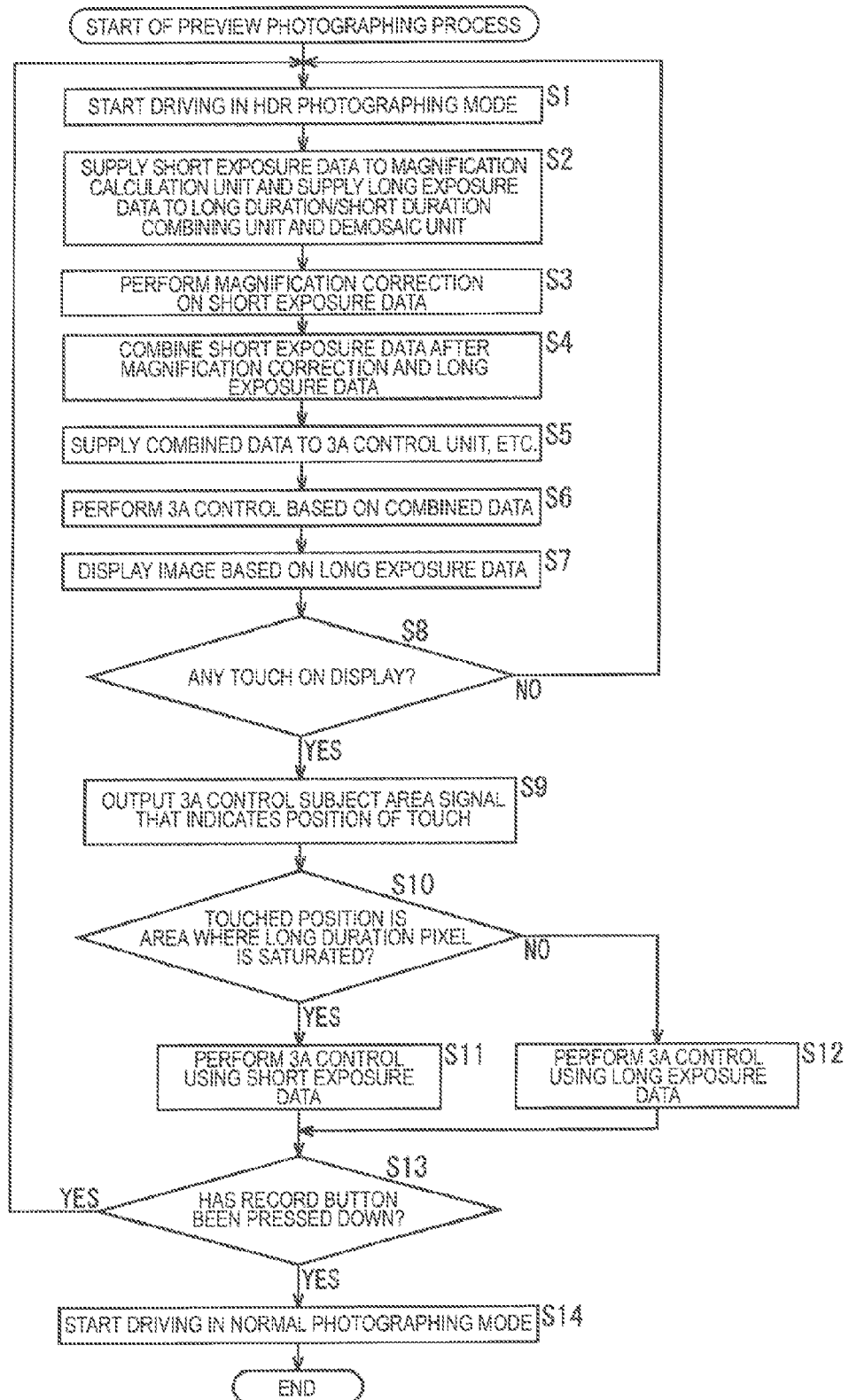
FIG. 14 is a flowchart describing a preview photographing process.

Referring next to the flowchart in FIG. 14, a preview photographing process that is a process during preview photographing of the imaging device 1 will be described. For example, when the imaging device 1 is powered-up, the process in FIG. 14 is started.

First, in step S1, on the basis of an instruction from the control unit 30, the 3A control unit 19 drives the solid state imaging element 13 in HDR photographing mode. The solid state imaging element 13 starts driving in HDR photographing mode. In HDR photographing mode, as illustrated in A of FIG. 5, the exposure amount is set to either the long duration pixel or the short duration pixel, and the photographed pixel data is supplied to the memory unit 16.

In step S2, the memory unit 16 supplies the short exposure data (the pixel data of the abort duration pixels) to the magnification calculation unit 17 and supplies the long exposure data (the pixel data of the long duration pixels) to the long duration/short duration combining unit 18 and the demosaic unit 21.

In step S3, the magnification calculation unit 17 magnifies the short exposure data supplied from the memory unit 16 by the exposure amount ratio and supplies the short exposure data after magnification correction to the long duration/short duration combining unit 18.

In step S4, the long duration/short duration combining unit 18 combines the short exposure data after magnification correction supplied from the magnification calculation unit 17, and the long exposure data supplied from the memory unit 16.

Subsequently, in step S5, the long duration/short duration combining unit 18 supplies the combined data obtained as a result of the combining to the 3A control unit 19, a moving photographic subject detection unit 20, and a pattern detection unit 28.

In step S6, the 3A control unit 19 performs 3A control on the basis of the combined data that is a signal with a high dynamic range.

In step S7, the display 24 displays an image on the basis of the long exposure data. Note that the processing in step S7 may be executed in parallel with the processing from steps S3 to S6.

In step S8, on the basis of the touch input information from the touch panel 25, the control unit 30 determines whether the display 24 has been touched by the user.

In step S8, when it is determined that there has been no touch of the user, the process returns to step S1 and the processes from there and after are executed again. That is, the 3A control on the basis of the combined data, and the display of the image on the basis of the long exposure data on the display 24 are continued.

On the other hand, in step S8, when it is determined that there has been a touch of the user, the process proceeds to step S9, and on the basis of the touch input information from the touch panel 25, the control unit 30 outputs, to the 3A control unit 19, a 3A control subject area signal that indicates the position of the touch.

In step S10, on the basis of the acquired 3A control subject area signal, the 3A control unit 19 determines whether the touched position is an area in which the long duration pixel is saturated.

In step S10, when it is determined that the touch position is an area in which the long duration pixel is saturated, the process proceeds to step S11, and the 3A control unit 19 performs the 3A control using the short exposure data around the touched position.

The 3A control unit 19 can instantaneously calculate the optimum exposure amount by using the pixel data of the short duration pixels with the following calculation formula, for example. Optimum exposure amount Y<saturation signal value a÷(short duration pixel value b×exposure amount ratio c)×long duration exposure amount d Note that the calculation formula of the optimum exposure amount is not limited to the calculation formula described above but any calculation formula may be employed.

On the other hand, in step S10, when it is determined that the touch position is an area in which the long duration pixel is not saturated, the process proceeds to step S12, and the 3A control unit 19 performs the 3A control using the long exposure data of the touched position.

In the processing of steps S11 and S12, the exposure amount of the long duration pixels is set to the optimum exposure amount. The exposure amount of the short duration pixels may be a preset, optional (fixed) exposure amount, or may be an exposure amount obtained using a predetermined exposure amount ratio with respect to the exposure amount of the long duration pixels that have been set at the optimum value.

In step S13, the control unit 30 determines whether the record button has been pushed down. In step S13, when it is determined that the record button has not yet been pushed down, the process returns to step S1 and the above-described process is repeated.

On the other hand, in step S13, when it is determined that the record button has been pushed down, the process proceeds to step S14 and the control unit 30 switches the HDR photographing mode to the normal photographing mode, the solid state imaging element 13 starts driving in the normal photographing mode, and the preview photographing process is ended.

Note that when the normal photographing mode is started, the exposure amount that was set to the long duration pixels of the solid state imaging element 13 in HDR photographing mode is set to all of the pixels.

7. Modifications

In the example described above, in the HDR photographing mode during preview photographing, the pixel data of the long duration pixels are supplied to the display 24, and in the normal photographing mode during recording photographing, the exposure amount of all of the pixels is uniformized to the exposure amount of the long duration pixel;

however, the pixel data of the short duration pixels may be used. In other words, in the HDR photographing mode during preview photographing, the pixel data of the short duration pixels may be supplied to the display 24, and in the normal photographing mode during recording photographing, the exposure amount of all of the pixels may be uniformized to the exposure amount of the short duration pixel. In the above case, the short duration pixel will be set at the optimum exposure amount in the processing of steps S11 and S12 described above.

In a case in which the pixel data of the short duration pixels are used, since the short duration pixels do not easily become saturated, a signal that does not saturate may be used in the 3A control. However, because the accumulation time is short, noise of the pixel data of the short duration pixels is large (S/N ratio is small); accordingly, when performing the 3A control, for example, an adverse effect occurs in an AF method in which the focus position is adjusted from the contrast. Accordingly, in an area in which the long duration pixels are not saturated, as described with the flowchart in FIG. 14, it is desirable to perform the 3A control (contrast AF and the like) by using long duration pixels that have small noise (large S/N ratio).

In the embodiment described above, the number of types of exposure amounts in the HDR photographing mode during preview photographing was two, namely, the short duration and the long duration; however, the number of types of exposure amounts in the HDR photographing mode may be three or more. In such a case, the number of types of exposure amounts in normal photographing mode during recording photographing may be less than the number of types of exposure amounts in the HDR photographing mode during preview photographing.

For example, in the HDR photographing mode during preview photographing, the imaging device 1 performs the 3A control using four types of exposure amounts, namely, an exposure amount +, an exposure amount ++, an exposure amount +++, and an exposure amount ++++. Note that "+" represents a fixed exposure amount and indicates that as the number of "+" becomes large, the exposure amount becomes large.

In the above case, in preview photographing, the imaging device 1 displays an image, on the display 24, that use two types of pixel data, namely, the exposure amount +++ and the exposure amount ++++ that have large exposure amounts. Furthermore, the imaging device 1 performs the 3A control so that the pixels of the exposure amount +++ and the exposure amount ++++ have optimum exposure amounts. After the above, when switching to the normal photographing mode from the HDR photographing mode, the imaging device 1 records, in the recording medium 27, an image that is obtained by setting the exposure amount of all of the pixels to the exposure amount +++ or the exposure amount +++.

As above, in the HDR photographing mode during preview photographing the imaging device 1 may set a plurality of types of exposure amounts to the pixel group, and in normal photographing mode during recording photographing, the imaging device 1 may set at least one of the exposure amounts during preview photographing and fewer types of exposure amounts than in the HDR photographing mode. In the above case as well, during recording photographing, compared to during preview photographing, the number of types of exposure amounts is small and resolution is improved; accordingly, compared to during preview photographing, a sense of resolution can be improved.

Furthermore, the method of arranging the short duration pixels and the long duration pixels in the HDR photographing mode during preview photographing is not limited to the array illustrated in A of FIG. 5 but is optional. For example, the method of arrangement may be one that is illustrated in FIG. 1, such as the array P1 or P2. Furthermore, the array may be an array described in JP 2010-28423A in which a 2×2 pixel is deemed as a unit pixel.

Note that in the example described above, among the 3A control, control of exposure amount (AE) has been described mainly; however it goes without saying that similar control can be performed in the cases of auto focus control and auto white balance control.

Figure 15:
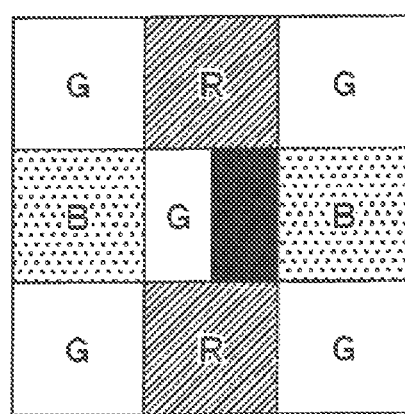
FIG. 15 is a diagram describing a phase difference pixel.

Furthermore, the auto focus control can be performed using the contrast information of the short duration pixels, or, as arranged in the center portion of a 3×3 pixel illustrated in FIG. 15, a phase difference pixel, in which a portion of the pixel is shaded, may be mixed in the pixel group of the solid state imaging element 13, and the 3A control unit 19 may perform auto focus control using the signal from the phase difference pixel.

Since a portion of the phase difference pixel is shaded, even if the exposure amount is act as that of the long duration pixel, saturation does not easily occur compared to a normal pixel; however, if saturation has occurred, the auto focus control may be performed using the phase difference pixel in which the exposure amount is set as that of the short duration pixel. Note that a method of auto focus control using a signal of a phase difference pixel is described in JP 2010-160313A, for example.

In a long duration pixel with a large exposure amount, even fluorescent light or even the sun causes saturation; however, the short duration pixel can be set so as not to become saturated by a certain brightness (for example, fluorescent light). In other words, since the signal that is near the light emitting source of the light source can be obtained (the farther away from the light source, the estimation becomes more difficult since the colors of the plurality of light sources become mixed), it is possible to estimate the light source in a more accurate manner from the RGB ratio of the light source. On the basis of the light source estimation result, the 3A control unit is capable of properly controlling the auto white balance. For example, if the light source is a warm-colored light bulb, control such as having the white balance be one with a slightly intense red so that the light is close to the memory color can be executed.

8. Examples of Application to Electronic Devices

The imaging function of the imaging device 1 described above can be applied to electronic devices in general such as, for example, a digital still camera, a video camera, a portable terminal such as a smartphone (multifumctional portable phone) having an imaging function, a capsule endoscope, a spectacle type imaging device such as a pair of spectacles added with an imaging function.

Hereinafter, specific examples of electronic devices to which the imaging function of the imaging device 1 has been applied will be described. Note that the imaging function of the imaging device 1 refers to a function of the solid state imaging element 13 of generating a signal, a function performed by the magnification calculation unit 17, the long duration/short duration combining unit 18, the 3A control unit 19, the demosaic unit 21, and the control unit 30 of performing control using the generated pixel signal.

<Imaging Device in Chip Form>

Figure 16:
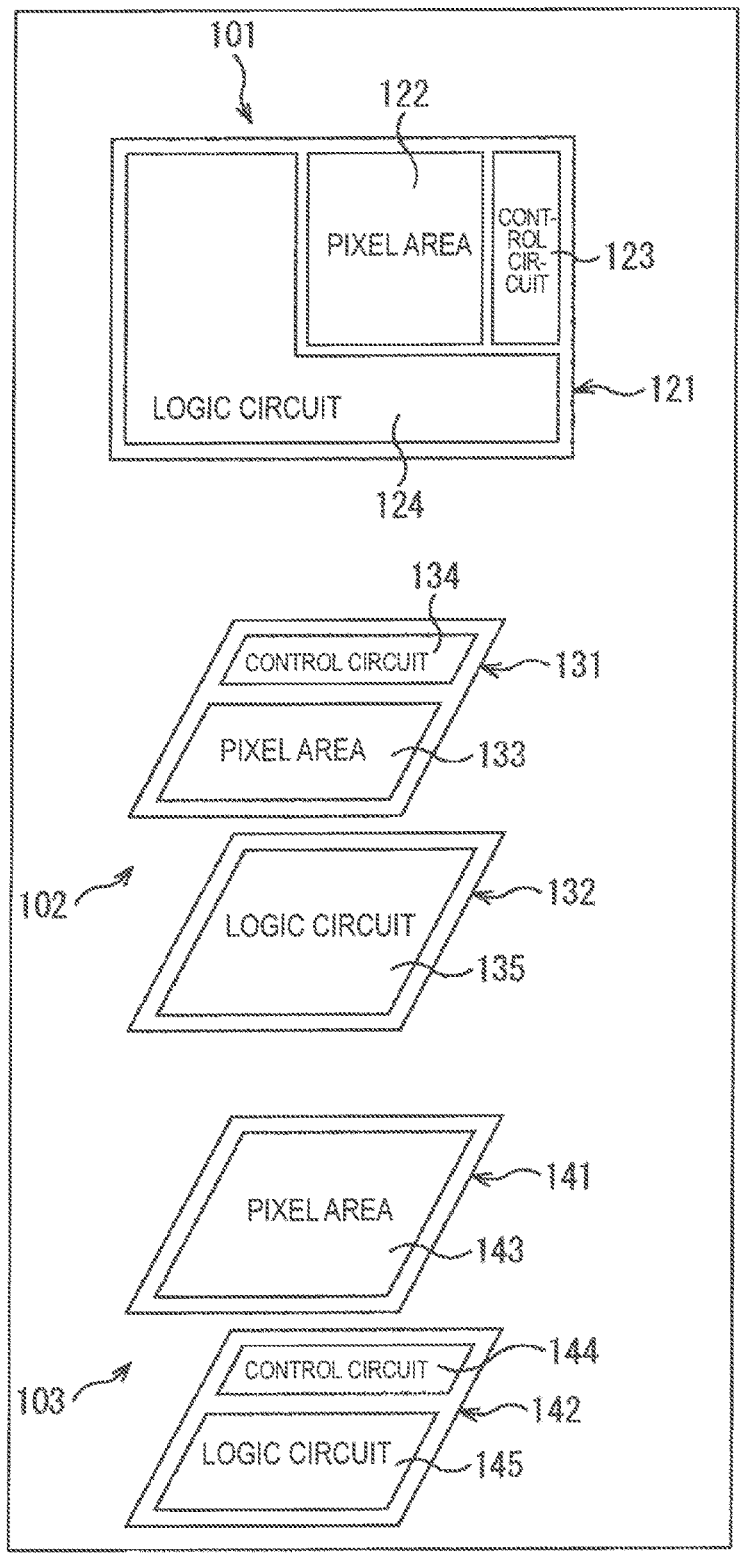
FIG. 16 is a diagram illustrating an exemplary configuration of the imaging device of the present disclosure formed as a chip.

FIG. 16 illustrates an example in which the imaging function of the imaging device 1 is configured in a chip form. That is, the imaging function of the imaging device 1 may be configured in a chip form illustrated in FIG. 16 as imaging devices 101 to 103.

The imaging device 101 illustrated in the upper row in FIG. 16 includes a pixel area 122 in which a pixel group is formed, a control circuit 123 that supplies a control signal to the pixel group, a logic circuit 124 including a signal processing circuit of the 3A control unit 19 and the control unit 30 described above, which are mounted on a single semiconductor chip 121.

The imaging device 102 illustrated in the middle row in FIG. 16 includes a first semiconductor chip portion 131 and a second semiconductor chip portion 132. A pixel area 133 and a control circuit 134 are mounted on the first semiconductor chip portion 131, and a logic circuit 135 including a signal processing circuit of the 3A control unit 19 and the control unit 30 described above are mounted on the second semiconductor chip portion 132. Furthermore, by having the first semiconductor chip portion 131 and the second semiconductor chip portion 132 be electrically connected to each other, the imaging device 102 is configured as a single semiconductor chip.

The imaging device 103 illustrated in the lower row in FIG. 16 includes a first semiconductor chip portion 141 and a second semiconductor chip portion 142. A pixel area 143 is mounted on the first semiconductor chip portion 141, and a control circuit 144 and a logic circuit 145 including a signal processing circuit of the 3A control unit 19 and the control unit 30 described above are mounted on the second semiconductor chip portion 142. Furthermore, by having the first semiconductor chip portion 141 and the second semiconductor chip portion 142 be electrically connected to each other, the imaging device 103 is configured as a single semiconductor chip.

<Example of Application to Capsule Endoscope>

Figure 17:
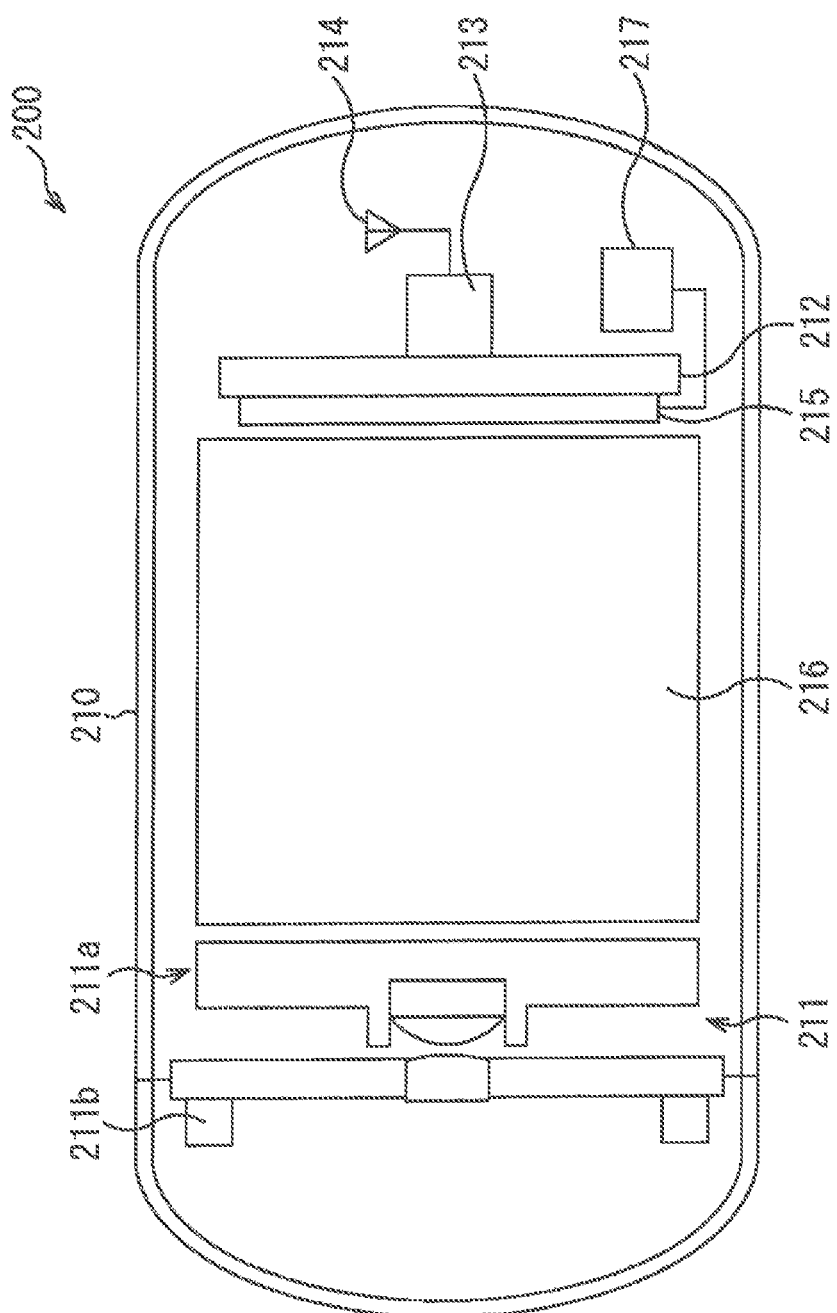
FIG. 17 is a diagram illustrating a cross-sectional configuration of a capsule endoscope equipped with the imaging device of the present disclosure.

FIG. 17 is a diagram illustrating a cross-sectional configuration of a capsule endoscope equipped with the imaging function of the imaging device 1.

A capsule endoscope 200 in FIG. 17 includes, inside a housing 210 in which both end faces are, for example, hemispheric and a middle portion has a cylindrical shape, a camera (a micro camera) 211 for photographing an intracavital image, a memory 212 for recording image data photographed by the camera 211, and a radio transmitter 213 for transmitting the recorded image data to the outside through an antenna 214 after the capsule endoscope 200 is discharged outside the body of the subject.

Furthermore, a CPU 215 and a coil (magnetic-force/current conversion coil) 216 are provided in the housing 210.

The CPU 215 controls the photographing of the camera 211, an operation of accumulating data in the memory 212, as well as controlling data transmission from the memory 212 to a data receiving device (not shown) outside the housing 210 with the radio transmitter 213.

The coil 216 supplies electric power to the camera 211, the memory 212, the radio transmitter 213, the antenna 214, and a light source 211b described later.

Furthermore, a reed (magnetic) switch 217 for detecting, when the capsule endoscope 200 is set to the data receiving device, that the capsule endoscope 200 is set to the data receiving device is provided in the housing 210. The reed switch 217 detects that the capsule endoscope 200 is set to the data receiving device, and at the point when data transmission can be performed, electric power is supplied to the radio transmitter 213 from the coil 216.

The camera 211 includes a solid state imaging element 211a including an objective optical system for photographing an intracavital image, for example, and a plurality (two in this case) light sources 211b for intracavitary lighting. The light sources 211b each include a light emitting diode (an LED).

The solid state imaging element 211a corresponds to the solid state imaging element 13 in FIG. 4, and the CPU 215 performs control corresponding to the control of each of the 3A control unit 19 and the control unit 30 in FIG. 4.

<Example of Application to Smartphone>

Figure 18:
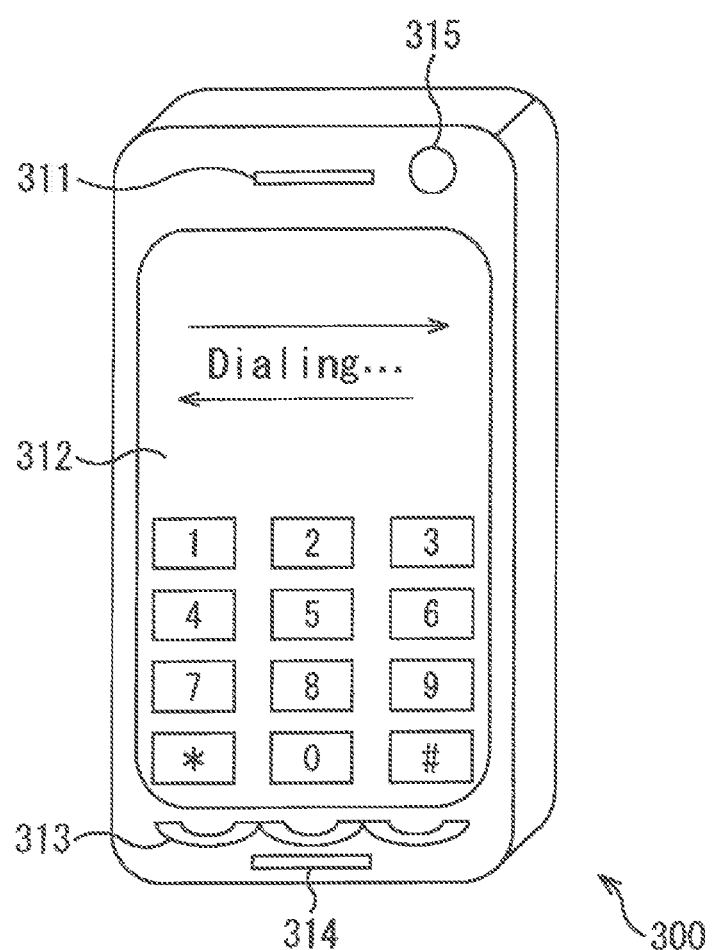
FIG. 18 is a diagram illustrating a configuration of an appearance of a smartphone including the imaging device of the present disclosure.

FIG. 18 is a diagram illustrating a configuration of an appearance of a smartphone equipped with the imaging function of the imaging device 1.

A smartphone 300 includes a loudspeaker 311, a display 312, operation buttons 313, a microphone 314, and an imaging unit 315.

When a telephone function is executed with the smartphone 300, transmitting voice acquired through the microphone 314 is transmitted to a base station through a communication unit (not shown), and the reception voice from a person that one is speaking to is supplied to the loudspeaker 311 from the communication unit and sound reproduction thereof is performed.

The display 312 is formed oft for example, a liquid crystal display (LCD) and displays a predetermined screen such as a phone standby screen or the like. A touch panel is superimposed on the display 312 such that operation on and input to the display 312 with a finger of a user or the like can be detected. The smartphone 300 is capable of performing a predetermined processing such as an execution of the photographing function and the like according to the detected operation and input of the user.

The imaging unit 315 includes a solid state imaging element and an optical lens, and takes an image of a photographic subject and stores the image data obtained as a result inside a memory and the like. The solid state imaging element of the imaging unit 315 corresponds to the solid state imaging element 13 in FIG. 4, and the 3A control unit 19 and the control unit 30 are implemented by a CPU provided inside the smartphone 300.

<Example of Application to Spectacle Type Imaging Device>

Figure 19:
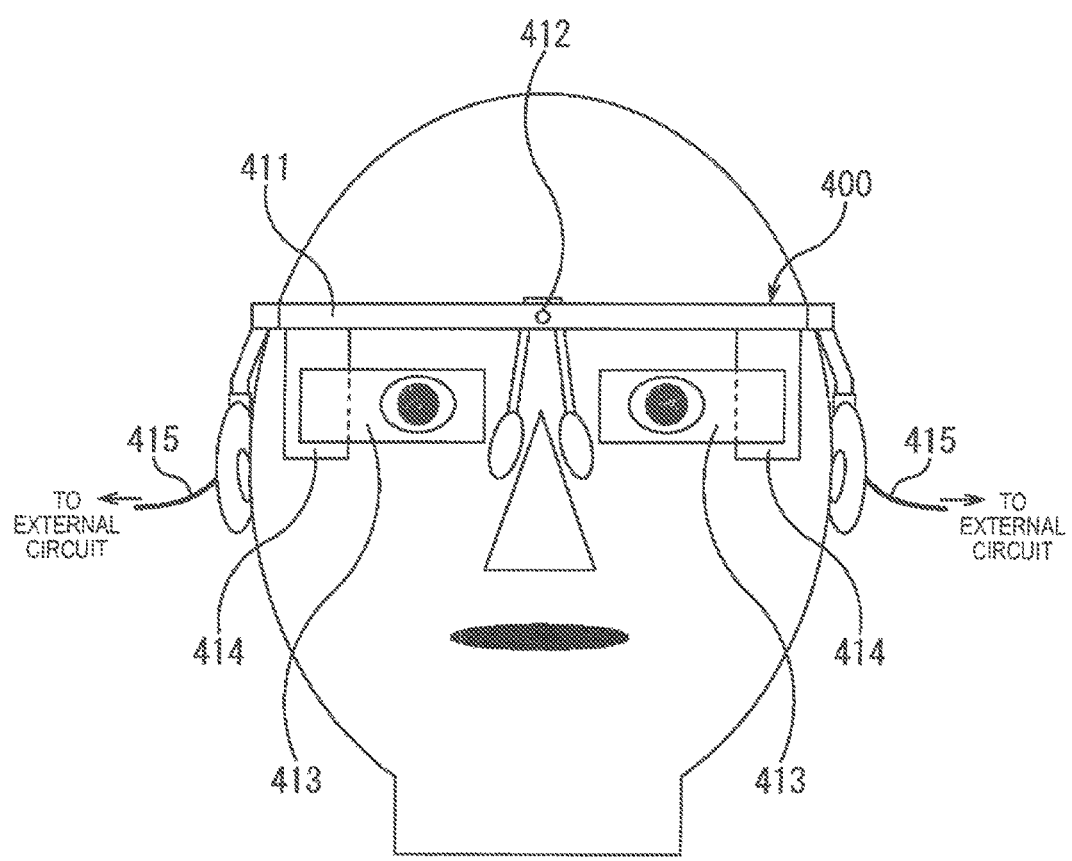
FIG. 19 is a diagram illustrating an exemplary configuration of a spectacle type imaging device including the imaging device of the present disclosure.

FIG. 19 illustrates an exemplary configuration of a spectacle type imaging device equipped with the imaging function of the imaging device 1.

A spectacle type imaging device 400 in FIG. 19 includes a solid state imaging element 412 attached to a middle portion of a frame 411, and a housing 414 that fixes the pair of spectacle lenses 413 and that has an image signal processing circuit that drives and controls the solid state imaging element 412 built therein.

The solid state imaging element 412 corresponds to the solid state imaging element 13 in FIG. 4. The image signal processing circuit provided inside the housing 414 includes a control function of the 3A control unit 19 and the control unit 30 in FIG. 4, detects the movements of the eyeballs of the user, and performs 3A control in accordance with the orientations (movements) of the eyeballs.

The image data photographed by the solid state imaging element 412 is transmitted to an external circuit through a communication cable 415. It goes without saying that the spectacle type imaging device 400 may have a radio communication function and transmit the image data through radio communication. Furthermore, the image photographed by the solid state imaging element 412 may be projected on the pair of spectacle lenses 413.

The embodiment of the present disclosure is not limited to the above-described embodiment and various modifications can be made without departing from the scope of the present disclosure.

For example, a form may be employed in which all of the plurality of embodiments described above or some thereof are combined.

In the example described above, description has been given that the pixel group of the solid state imaging element 13 is arranged according to the Bayer array; however, the pixel group may be arranged according to other arrays such as a clear bit array and the like. Furthermore, regarding color filters, not only R, G, and B, but white filter (W), infrared filter (IR), and the like may be included. Furthermore, the solid state imaging element 13 may be a backside irradiation type or a front side irradiation type solid state imaging element, or may be, as disclosed in JP 2011-29337A, the solid state imaging element 13 may be a vertical spectroscopic solid state imaging element in which an organic photoelectric conversion film and an inorganic photoelectric conversion layer are stacked in the vertical direction.

Note that steps written in the flowcharts accompanying this specification may of course be executed in a time series in the illustrated order, but such steps do not need to be executed in a time series and may be carried out in parallel or at necessary timing, such as when the processes are called.

The effects described in the present specification are not limiting but are merely examples, and there may be additional effects.

Additionally, the present technology may also be configured as below.

(1)

A control device including:

a control unit configured to control an exposure amount of a pixel group that is a two-dimensional arrangement of a plurality of pixels, wherein, in a first mode before recording of a photographed image is started, the control unit sets a plurality of types of exposure amounts to the pixel group, and in a second mode in which the photographed image is recorded, the control unit sets fewer types of exposure amounts than in the first mode to the pixel group.

(2)

The control device according to (1), wherein the control unit sets, to the pixel group in the second mode, at least one of the plurality of types of exposure amounts set to the pixel group in the first mode.

(3)

The control device according to (1) or (2), wherein, in the first mode, the control unit sets, to the pixel group, the exposure amount that is obtained not by using a pixel signal of a saturated pixel but by using a pixel signal of an unsaturated pixel.

(4)

The control device according to (3), wherein the control unit sets, to the pixel group, the exposure amount that is obtained by using, among pixel signals with the plurality of types of exposure amounts, a pixel signal of the unsaturated pixel that has a larger S/N ratio.

(5)

The control device according to any of (1) to (4), wherein, in the first mode, the control unit sets the exposure amount that is obtained by using, among pixel signals with the plurality of types of exposure amounts, a pixel signal having a high dynamic range.

(6)

The control device according to (5), wherein the control unit sets the exposure amount that is obtained by using the pixel signal having a high dynamic range that is higher than a dynamic range of a pixel signal for displaying on a display.

(7)

The control device according to (5), further including:

an area specifying unit configured to specify a predetermined area of the pixel group that is an area subject to determination of the exposure amount, wherein the control unit sets the exposure amount that is obtained by using the pixel signal having a high dynamic range in the area specified by the area specifying unit.

(8)

The control device according to (7), wherein the area specifying unit specifies an area of a face of a user in the photographed image as the predetermined area that is the area subject to determination of the exposure amount.

(9)

The control device according to (7), wherein the area specifying unit specifies an area designated by a user in the photographed image as the predetermined area that is the area subject to determination of the exposure amount.

(10)

The control device according to (7), wherein the area specifying unit specifies an area where a predetermined object exists in the photographed image as the predetermined area that is the area subject to determination of the exposure amount.

(11)

The control device according to any of (1) to (10).

wherein, in the first mode, the control unit sets two types of exposure amounts to the pixel group, and in the second mode, the control unit sets a single type of exposure amount to the pixel group.

(12)

The control device according to (11), further including:

a combining unit configured to combine a pixel signal on which magnification correction has been performed by multiplying a pixel signal of a pixel having a small exposure amount by an exposure amount ratio, and a pixel signal of a pixel having a large exposure amount, wherein, in the first mode, the combining unit combines the pixel signal on which the magnification correction has been performed and the pixel signal of the pixel having the large exposure amount and supplies the resultant signal to the control unit, and in the second mode, the combining unit supplies a pixel signal having a single type of exposure amount to the control unit.

(13)

The control device according to any of (1) to (12), further including:

a combining unit configured to combine a pixel signal on which magnification correction has been performed by multiplying a pixel signal of a pixel having a small exposure amount by an exposure amount ratio, and a pixel signal of a pixel having a large exposure amount, wherein, in the first mode, the combining unit outputs, as a signal for displaying on a display, a signal obtained by clipping, at a display tone of the second mode, a signal in which the pixel signal on which the magnification correction has been performed and the pixel signal of the pixel having the large exposure amount have been combined together.

(14) The control device according to (12),
wherein, in the first mode, the control unit performs auto focus control as well on a basis of the signal that has been combined by the combining unit.

(15) The control device according to (12) or (14),
wherein, in the first mode, the control unit generates color control information for white balance as well on a basis of the signal that has been combined by the combining unit.

(16) The control device according to any of (1) to (15),
wherein a phase difference pixel is included in the pixel group, and
wherein the control unit performs auto focus control as well by using a pixel signal of the phase difference pixel.

(17) A control method by a control device that controls an exposure amount of a pixel group that is a two-dimensional arrangement of a plurality of pixels, the control method including:
setting, in a first mode before recording of a photographed image is started, a plurality of types of exposure amounts to the pixel group, and setting, in a second mode in which the photographed image is recorded, fewer types of exposure amounts than in the first mode to the pixel group.

(18) An electronic device including:
a solid state imaging element including a pixel group that is a two-dimensional arrangement of a plurality of pixels; and
a control unit configured to, in a first mode before recording of a photographed image is started, set a plurality of types of exposure amounts to the pixel group, and in a second mode in which the photographed image is recorded, set fewer types of exposure amounts than in the first mode to the pixel group.

REFERENCE SIGNS LIST 1 imaging device
13 solid state imaging element
16 memory unit
17 magnification calculation unit
18 long duration/short duration combining unit
19 3A control unit
24 display
25 touch panel
26 recording control unit
27 recording medium
30 control unit
101 to 103 imaging device
200 capsule endoscope
300 smartphone
400 spectacle type imaging device

The invention claimed is:

1. A control device, comprising:
at least one central processing unit (CPU) configured to:
control an exposure amount of a pixel group of a plurality of pixel groups, wherein each pixel group of the plurality of pixel groups is a two-dimensional arrangement of a plurality of pixels;
set a first plurality of exposure amounts to the plurality of pixel groups, based on a first mode of the control device,
wherein the first mode corresponds to a first state of the control device prior to recordation of an image;
acquire pixel data based on the set first plurality of exposure amounts; and
set a second plurality of exposure amounts to the plurality of pixel groups, based on the acquired pixel data and based on a second mode of the control device,
wherein the second mode corresponds to a second state of the control device in which the image is recorded, and
wherein the second plurality of exposure amounts in the second mode is less than the first plurality of exposure amounts in the first mode.

2. The control device according to claim 1,
wherein the at least one CPU is further configured to set, to the plurality of pixel groups in the second mode, at least one of the first plurality of exposure amounts set to the plurality of pixel groups in the first mode.

3. The control device according to claim 1,
wherein, in the first mode, the at least one CPU is further configured to set, to the plurality of pixel groups, a first exposure amount of the second plurality of exposure amounts, wherein the first exposure amount is obtained based on a first pixel signal of an unsaturated pixel.

4. The control device according to claim 3,
wherein the at least one CPU is further configured to set, to the plurality of pixel groups, the first exposure amount, wherein the unsaturated pixel has a larger S/N ratio among a plurality of pixel signals with the first plurality of exposure amounts.

5. The control device according to claim 1,
wherein, in the first mode, the at least one CPU is further configured to set a first exposure amount of the second plurality of exposure amounts, and wherein the first exposure amount is obtained based on a second pixel signal having a high dynamic range among a plurality of pixel signals with the first plurality of exposure amounts.

6. The control device according to claim 5,
wherein the at least one CPU is further configured to set the first exposure amount, wherein the high dynamic range of the second pixel signal is higher than a dynamic range of a third pixel signal used for a display screen.

7. The control device according to claim 5, wherein the at least one CPU is further configured to:
specify a first area of the plurality of pixel groups, wherein the first area is subject to determination of the first exposure amount; and
set the first exposure amount that is obtained based on the second pixel signal having the high dynamic range in the specified first area.

8. The control device according to claim 7,
wherein the at least one CPU is further configured to specify a second area, of a face of a user in the image, as the first area that is subject to the determination of the first exposure amount.

9. The control device according to claim 7,
wherein the at least one CPU is further configured to specify a second area, designated by a user in the image, as the first area that is subject to the determination of the first exposure amount.

10. The control device according to claim 7,
wherein the at least one CPU is further configured to specify a second area, where an object exists in the image, as the first area that is subject to the determination of the first exposure amount.

11. The control device according to claim 1, wherein the at least one CPU is further configured to:
   set, in the first mode, at least two exposure amounts of the first plurality of exposure amounts to the plurality of pixel groups; and
   set, in the second mode, a single exposure amount from the second plurality of exposure amounts to the plurality of pixel groups.

12. The control device according to claim 11, wherein the at least one CPU is further configured to:
   generate a first pixel signal,
      wherein a magnification of the first pixel signal is corrected by a multiplication of a second pixel signal of a first pixel of the plurality of pixels by an exposure amount ratio, and
      wherein the first pixel has a first exposure amount; and
   combine the first pixel signal and a third pixel signal of a second pixel of the plurality of pixels to generate a resultant signal based on the combination, wherein the second pixel has a second exposure amount in the first mode.

13. The control device according to claim 11, wherein the at least one CPU is further configured to:
   combine a first pixel signal and a third pixel signal of a second pixel having a second exposure amount to generate a resultant signal, wherein a magnification of the first pixel signal is corrected by a multiplication of a second pixel signal of a first pixel having a first exposure amount by an exposure amount ratio; and
   clip, at a display tone of the second mode, the resultant signal.

14. The control device according to claim 12, wherein, in the first mode, the at least one CPU is further configured to control auto focus based on the resultant signal.

15. The control device according to claim 12, wherein, in the first mode, the at least one CPU is further configured to generate color control information for white balance based on the resultant signal.

16. The control device according to claim 1,
   wherein a phase difference pixel is included in each of the plurality of pixel groups, and
   wherein the at least one CPU is further configured to control auto focus based on a pixel signal of the phase difference pixel.

17. A control method, comprising:
   in a control device:
   controlling an exposure amount of a pixel group of a plurality of pixel groups, wherein each pixel group of the plurality of pixel groups is a two-dimensional arrangement of a plurality of pixels;
   setting a first plurality of exposure amounts to the plurality of pixel groups, based on a first mode of the control device,
   wherein the first mode corresponds to a first state of the control device prior to recording of an image;
   acquiring pixel data based on the set first plurality of exposure amounts; and
   setting a second plurality of exposure amounts to the plurality of pixel groups, based on the acquired pixel data and based on a second mode of the control device,
   wherein the second mode corresponds to a second state of the control device in which the image is being recorded, and
      wherein the second plurality of exposure amounts in the second mode is less than the first plurality of exposure amounts in the first mode.

18. An electronic device, comprising:
   a solid state imaging element including a pixel group of a plurality of pixel groups, wherein each pixel group of the plurality of pixel groups is a two-dimensional arrangement of a plurality of pixels; and
   at least one central processing unit (CPU) configured to:
      control an exposure amount of the pixel group of the plurality of pixel groups;
      set a first plurality of exposure amounts to the plurality of pixel groups, based on a first mode of the electronic device,
      wherein the first mode corresponds to a first state of the electronic device prior to recordation of an image;
      acquire pixel data based on the set first plurality of exposure amounts; and
      set a second plurality of exposure amounts to the plurality of pixel groups, based on the acquired pixel data and based on a second mode of the electronic device,
      wherein the second mode corresponds to a second state of the electronic device in which the image is recorded, and
      wherein the second plurality of exposure amounts in the second mode is less than the first plurality of exposure amounts in the first mode.

* * * * *